United States Patent

Ohtani

Patent Number: 6,052,494
Date of Patent: Apr. 18, 2000

[54] IMAGE FILING APPARATUS AND METHOD FOR DISPLAYING A RETRIEVAL RESULT LIST REPRESENTING THE RETRIEVAL OF A STORED DOCUMENT IMAGE OR FOR DISPLAYING THE INDEX OF A DOCUMENT IMAGE RETRIEVED BY RETRIEVAL MEANS

[75] Inventor: Kazuo Ohtani, Kodaira, Japan

[73] Assignee: Canon Kabushiki Kaisha, Tokyo, Japan

[21] Appl. No.: 08/963,911

[22] Filed: Nov. 4, 1997

Related U.S. Application Data

[63] Continuation of application No. 08/350,108, Nov. 29, 1994, abandoned.

[30] Foreign Application Priority Data

Nov. 30, 1993 [JP] Japan ................................. 5-325992
Apr. 15, 1994 [JP] Japan ................................. 6-101926

[51] Int. Cl.$^7$ .................................................. G06K 9/00
[52] U.S. Cl. .......................................................... 382/306
[58] Field of Search .................................. 382/175, 176, 382/305, 306, 317

[56] References Cited

U.S. PATENT DOCUMENTS

| | | | |
|---|---|---|---|
| 4,808,987 | 2/1989 | Takeda et al. | 340/721 |
| 5,093,653 | 3/1992 | Ikehira | 382/290 |
| 5,129,016 | 7/1992 | Murakami et al. | 382/306 |
| 5,179,649 | 1/1993 | Masuzaki et al. | 395/148 |
| 5,321,831 | 6/1994 | Hirose | 395/600 |
| 5,406,384 | 4/1995 | Sakuragi | 358/403 |

FOREIGN PATENT DOCUMENTS

| | | | |
|---|---|---|---|
| 0251237 | 1/1988 | European Pat. Off. | H04N 1/21 |
| 0435314 | 7/1991 | European Pat. Off. | G06F 15/40 |
| 0435316 | 7/1991 | European Pat. Off. | G06F 15/40 |
| 34 46 593 | 7/1985 | Germany | G06F 15/40 |

*Primary Examiner*—Andrew W. Johns
*Attorney, Agent, or Firm*—Fitzpatrick, Cella, Harper & Scinto

[57] ABSTRACT

An image filing apparatus includes a read unit to read an image of an original, a judgment unit to judge whether the original read by the read unit is a specific original or not, an extraction unit to extract the image of a specific area of the original which was judged as a specific original by the judgment unit, a setting unit to set the image extracted by the extraction unit as a title of the original which is not judged as a specific original by the judgment unit, a storage unit to store the image which is not judged as a specific original in a memory medium, and a forming unit to form a management table in which the title set by the setting unit and the storing address of the image to be stored in the memory medium are made to correspond to each other.

20 Claims, 24 Drawing Sheets

FIG. 4

1990-04-01 18:41   ALPHANUMERIC

THREE DOCUMENTS
ARE FOUND

| DOCUMENT NAME | MAKE-UP DATE | NUMBER OF PAGES |
|---|---|---|
| CYLINDER ENDURANCE EXPERIMENT REPORT | 92-08-25 | 15 |
| EXPERIMENT REPORT NO.53 | 92-10-12 | 20 |
| HEATING EXPERIMENT REPORT | 92-05-10 | 10 |

DOCUMENT MANAGEMENT FILE

| IMAGE INDEX PATTERN | GRAPHIC DOCUMENT NAME NODE | MAKE-UP DATE | TOTAL NUMBER OF PAGES | PAGE FILE POINTER |
|---|---|---|---|---|
| 101000100 | 121 | 92. 12. 15. | 3 | 1 |
| 001000010 | 592 | 92. 08. 25. | 15 | 4 |
| 110000010 | 85 | 92. 12. 25. | 3 | 19 |
| 001000010 | 251 | 92. 10. 12. | 20 | 18 |
| 101010000 | 118 | 92. 12. 25. | 8 | 21 |
| 001000010 | 98 | 92. 05. 10. | 10 | 17 |

FIG. 14

NODE TABLE

| NODE NUMBER | DATA SIZE | FAT ENTRY |
|---|---|---|
| 1 | 87654 | 23B6 |
| 2 | 56789 | 3342 |
| : | | |
| 5 | 76543 | 5658 |
| 6 | 23599 | 56A0 |
| 7 | 98765 | 570C |
| : | | |
| 12 | 89765 | 62B0 |
| 13 | 98752 | 632B |
| : | | |
| 20 | 87875 | 5086 |

FIG. 13

PAGE MANAGEMENT FILE

| PAGE FILE POINTER | FRONT-BACK SIDE MODE | OTHER IMAGE INFORMATION | NODE |
|---|---|---|---|
| 1 | ONE SIDE | ~ | 5 |
| 2 | ONE SIDE | ~ | 6 |
| 3 | ONE SIDE | ~ | 7 |
| 4 | BOTH SIDES | ~ | 12 |
| 5 | BOTH SIDES | ~ | 13 |
| : | : | : | : |
| 8 | ONE SIDE | ~ | 1 |
| 9 | ONE SIDE | ~ | 2 |
| 10 | BOTH SIDES/ FRONT SIDE | ~ | 20 |
| 11 | BOTH SIDES/ BACK SIDE | ~ | 20 |

| CLUSTER NUMBER | PHYSICAL ADDRESS ||
|---|---|---|
| | TRACK NUMBER | SECTOR NUMBER |
| 0 | 0 | 1~8 |
| 1 | 0 | 9~16 |
| 2 | 1 | 1~8 |
| ⋮ | ⋮ | ⋮ |

FIG. 17

| 62AC | 62AD | 62AE | 62AF | 62B0 | 62B1 | 62B3 | ... | 62BA | 62BB | 62BC | 62BD | ... |
|------|------|------|------|------|------|------|-----|------|------|------|------|-----|
| 0000 | FFFE | FFFE | FFFE | 62B1 | 62B2 | 62B4 | ... | 0000 | FFFF | FFFF | FFFF | ... |

ERASED AREAS              USED AREAS              UNUSED AREAS

FFFF : UNUSED
FFFE : ERASED
0000 : LAST CLUSTER OF FILE

FIG. 18

DOCUMENT MANAGEMENT FILE

| IMAGE INDEX PATTERN | MAKE-UP DATE | TOTAL NUMBER OF PAGES | PAGE FILE POINTER |
|---------------------|--------------|-----------------------|-------------------|
| 101000100 | 92. 12. 15. | 3 | 1 |
| 001000010 | 92. 08. 25. | 15 | 4 |
| 110000010 | 92. 12. 25. | 3 | 19 |
| 001000010 | 92. 10. 12. | 20 | 18 |
| 101010000 | 92. 12. 25. | 8 | 21 |
| 001000010 | 92. 05. 10. | 10 | 17 |

FIG. 19

DOCUMENT MANAGEMENT FILE

| IMAGE INDEX PATTERN | GRAPHIC DOCUMENT NAME NODE | MAKE-UP DATE | TOTAL NUMBER OF PAGES | PAGE FILE POINTER |
|---|---|---|---|---|
| 101000100 ·· | | 92. 12. 15. | 3 | 1 |
| 001000010 ·· | | 92. 08. 25. | 15 | 4 |
| 110000010 ·· | | 92. 12. 25. | 3 | 19 |
| 001000010 ·· | | 92. 10. 12. | 20 | 18 |
| 101010000 ·· | | 92. 12. 25. | 8 | 21 |
| 001000010 ·· | | 92. 05. 10. | 10 | 17 |

FIG. 20

| IMAGE INDEX PATTERN | CHARACTER CODE DOCUMENT NAME | GRAPHIC DOCUMENT NAME NODE | MAKE-UP DATE | TOTAL NUMBER OF PAGES | PAGE FILE POINTER |
|---|---|---|---|---|---|
| 101000100 | MINUTES OF FIRST PREVIOUS ARRANGEMENT OF BUDGET | 0 | 1993 - 03 - 34 | 4 | 1 |
| 001000010 | ORDER SLIP NO. 123~456 | 0 | 1993 - 03 - 06 | 334 | 4 |
| 110000010 | PERIPHERAL EQUIPMENT CATALOG | 0 | 1993 - 07 - 02 | 42 | 19 |
| 001000010 | | 251 | 1993 - 07 - 27 | 34 | 18 |
| 1010100000 | SCHEDULE TABLE OF YEAR | 0 | 1993 - 09 - 11 | 2 | 21 |
| 001000010 | WRITTEN REQUEST OF EQUIPMENT PURCHASE | 0 | 1993 - 09 - 14 | 432 | 17 |
| 001001010 | ORDER SLIP NO. 457~789 | 0 | 1993 - 09 - 21 | 222 | 55 |

FIG. 21

| TOTAL NUMBER OF FILES = 38 | TOTAL NUMBER OF IMAGES = 3456 | | 1993 - 06 - 24  20:12 |
|---|---|---|---|

| NUMBER | DOCUMENT NAME | NUMBER OF PAGES |
|---|---|---|
| 1 | MINUTES OF FIRST PREVIOUS ARRANGEMENT OF BUDGET | 4 |
| 2 | ORDER SLIP NO. 123 ~ 456 | 334 |
| 3 | PERIPHERAL EQUIPMENT CATALOG | 42 |
| 4 | *EXPERIMENT REPORT NO. 63* | 34 |
| 5 | SCHEDULE TABLE OF YEAR | 2 |
| 6 | WRITTEN REQUEST OF EQUIPMENT PURCHASE | 432 |
| 7 | ORDER SLIP NO. 457 ~ 789 | 222 |
| 8 | BUDGET APPLICATION OF LATTER HALF | 65 |
| 9 | PATENT ABSTRACT OF 1993 | 23 |
| 10 | ION BLADING EXPERIMENT | 15 |
| 11 | CVD EXPERIMENT | 48 |
| 12 | RESULT OF BUDGET DELIBERATION OF 1993 | 02 |
| 13 | SALES REPORT OF FIRST HALF OF 1993 | 15 |
| 14 | ORDER SLIP NO. 800 ~ 820 | 47 |
| 15 | DISC DRIVE CATALOG | 63 |
| 16 | PARTS DRAWING NO. 12345 | 25 |
| 17 | CARTRIDGE CATALOG | 48 |
| 18 | POWER SOURCE CATALOG | 96 |
| 19 | TRANSFORMER CATALOG | 21 |

| NUMBER | DOCUMENT NAME | NUMBER OF PAGES |
|---|---|---|
| 20 | SQL STANDARD | 123 |
| 21 | EIA-Class 1 DATA | 456 |
| 22 | HEATING-UP EXPERIMENT REPORT | 23 |
| 23 | EXAMINATION ITEMS DATA OF NEW PURCHASE | 21 |
| 24 | PURCHASE REQUEST OF ELECTRICAL PARTS | 15 |
| 25 | COLLECTION OF PLATES OF NEW CATALOG | 5 |
| 26 | PERSONAL HISTORY OF NEW MEMBER OF 1993 | 563 |
| 27 | TECHNICAL NEWS Vol. 1 | 45 |
| 28 | *SALES SLIP 85926* | 3 |
| 29 | EQUIPMENT ESTIMATE | 4 |
| 30 | *TRAINING RECORD OF NEW MEMBER* | 6 |
| 31 | REPAIR REQUEST | 14 |
| 32 | PERSONAL RECORD NO. 123 | 563 |
| 33 | MAP OF OUTSKIRTS OF TOKYO | 2 |
| 34 | SAFETY STANDARD | 164 |
| 35 | TECHNICAL ESTIMATION REPORT | 462 |
| 36 | SCHEDULE FROM MARCH TO MAY | 45 |
| 37 | OFFICE SUPPLIES PURCHASE REQUEST NO. 12 | 42 |
| 38 | RECORD NO. 234 OF PERSONAL RATE OF EFFICIENCY | 64 |

[ ↑ ] [ ← ] [ → ] [ ↓ ]    [ MARK ] [ «OTHER FUNCTION» ] [ IMAGE DISPLAY ] [ RETURN ]

FIG. 22

1993-06-24 20:12 | ROMAN CHARACTER

DISC INFORMATION (A)   RESIDUAL CAPACITY 12.3%
SAMPLE IMAGE FOR STUDYING CF-XI SPECIFICATION

ONE SIDE | F=12345/12345 | P=12345/12345
REVISED EDITION [9]

SPEC. | SLIP | MINUTES

GRAPHIC DOCUMENT NAME
EXPERIMENT REPORT NO.53

CHARACTER CODE DOCUMENT NAME
EXPERIMENT REPORT NO. 53

MAKE-UP DATE
1993-06-03

TRAILER INDEX

PLEASE INDEX ENTER

CELL INPUT | EXECUTE REGISTRATION | STOP

FILE − | FILE + | PAGE − | PAGE + | IMAGE MANIPULATION

FIG. 23

| IMAGE INDEX PATTERN | CHARACTER CODE DOCUMENT NAME | GRAPHIC DOCUMENT NAME NODE | MAKE-UP DATE | TOTAL NUMBER OF PAGES | PAGE FILE POINTER |
|---|---|---|---|---|---|
| 1010000100 | MINUTES OF FIRST PREVIOUS ARRANGEMENT OF BUDGET | 0 | 1993 - 03 - 34 | 4 | 1 |
| 0010000010 | ORDER SLIP NO. 123~456 | 0 | 1993 - 03 - 06 | 334 | 4 |
| 1100000010 | PERIPHERAL EQUIPMENT CATALOG | 0 | 1993 - 07 - 02 | 42 | 19 |
| 0010000010 | EXPERIMENT REPORT NO. 53 | 251 | 1993 - 07 - 27 | 34 | 18 |
| 1010010000 | SCHEDULE TABLE OF YEAR | 0 | 1993 - 09 - 11 | 2 | 21 |
| 0010000010 | WRITTEN REQUEST OF EQUIPMENT PURCHASE | 0 | 1993 - 09 - 14 | 432 | 17 |
| 0010001010 | ORDER SLIP NO. 457~789 | 0 | 1993 - 09 - 21 | 222 | 55 |

FIG. 24

| TOTAL NUMBER OF FILES = 38 | TOTAL NUMBER OF IMAGES = 3456 | | 1993 - 06 - 24 20:12 |
|---|---|---|---|

| NUMBER | DOCUMENT NAME | NUMBER OF PAGES |
|---|---|---|
| 1 | MINUTES OF FIRST PREVIOUS ARRANGEMENT OF BUDGET | 4 |
| 2 | ORDER SLIP NO.123 ~ 456 | 334 |
| 3 | PERIPHERAL EQUIPMENT CATALOG | 42 |
| 4 | EXPERIMENT REPORT NO.53 | 34 |
| 5 | SCHEDULE TABLE OF YEAR | 2 |
| 6 | WRITTEN REQUEST OF EQUIPMENT PURCHASE | 432 |
| 7 | ORDER SLIP NO.457 ~ 789 | 222 |
| 8 | BUDGET APPLICATION OF LATTER HALF | 65 |
| 9 | PATENT ABSTRACT OF 1993 | 23 |
| 10 | ION BLADING EXPERIMENT | 15 |
| 11 | CVD EXPERIMENT | 48 |
| 12 | RESULT OF BUDGET DELIBERATION OF 1993 | 02 |
| 13 | SALES REPORT OF FIRST HALF OF 1993 | 15 |
| 14 | ORDER SLIP NO.800 ~ 820 | 47 |
| 15 | DISC DRIVE CATALOG | 63 |
| 16 | PARTS DRAWING NO.12345 | 25 |
| 17 | CARTRIDGE CATALOG | 48 |
| 18 | POWER SOURCE CATALOG | 96 |
| 19 | TRANSFORMER CATALOG | 21 |

| NUMBER | DOCUMENT NAME | NUMBER OF PAGES |
|---|---|---|
| 20 | SQL STANDARD | 123 |
| 21 | EIA-Class 1 DATA | 456 |
| 22 | HEATING-UP EXPERIMENT REPORT | 23 |
| 23 | EXAMINATION ITEMS DATA OF NEW PURCHASE | 21 |
| 24 | PURCHASE REQUEST OF ELECTRICAL PARTS | 15 |
| 25 | COLLECTION OF PLATES OF NEW CATALOG | 5 |
| 26 | PERSONAL HISTORY OF NEW MEMBER OF 1993 | 563 |
| 27 | TECHNICAL NEWS Vol.1 | 45 |
| 28 | SALES SLIP 85926 | 3 |
| 29 | EQUIPMENT ESTIMATE | 4 |
| 30 | TRAINING RECORD OF NEW MEMBER | 6 |
| 31 | REPAIR REQUEST | 14 |
| 32 | PERSONAL RECORD NO.123 | 563 |
| 33 | MAP OF OUTSKIRTS OF TOKYO | 2 |
| 34 | SAFETY STANDARD | 164 |
| 35 | TECHNICAL ESTIMATION REPORT | 462 |
| 36 | SCHEDULE FROM MARCH TO MAY | 45 |
| 37 | OFFICE SUPPLIES PURCHASE REQUEST NO.12 | 42 |
| 38 | RECORD NO.234 OF PERSONAL RATE OF EFFICIENCY | 64 |

| ↓ | ↑ | → | ← | ↑↑ | | MARK | «OTHER FUNCTION» | IMAGE DISPLAY | RETURN |

FIG. 26

| TOTAL NUMBER OF FILES = 38 | TOTAL NUMBER OF IMAGES = 3456 | | 1993 - 06 - 24  20:12 |
|---|---|---|---|

| NUMBER | DOCUMENT NAME | GRAPHIC DOCUMENT NAME | NUMBER OF PAGES |
|---|---|---|---|
| 1 | MINUTES OF FIRST PREVIOUS ARRANGEMENT OF BUDGET | | 4 |
| 2 | ORDER SLIP NO.123 ~ 456 | | 334 |
| 3 | PERIPHERAL EQUIPMENT CATALOG — a | | 42 |
| 4 | | EXPERIMENT REPORT NO.63 — b  — c | 34 |
| 5 | SCHEDULE TABLE OF YEAR | | 2 |
| 6 | WRITTEN REQUEST OF EQUIPMENT PURCHASE | | 432 |
| 7 | ORDER SLIP NO.457 ~ 789 | | 222 |
| 8 | BUDGET APPLICATION OF LATTER HALF | | 65 |
| 9 | PATENT ABSTRACT OF 1993 | | 23 |
| 10 | ION BLADING EXPERIMENT | | 15 |
| 11 | CVD EXPERIMENT | | 48 |
| 12 | RESULT OF BUDGET DELIBERATION OF 1993 | | 02 |
| 13 | SALES REPORT OF FIRST HALF OF 1993 | | 15 |
| 14 | ORDER SLIP NO.800 ~ 820 | | 47 |
| 15 | DISC DRIVE CATALOG | | 63 |
| 16 | PARTS DRAWING NO.12345 | | 25 |
| 17 | CARTRIDGE CATALOG | | 48 |
| 18 | POWER SOURCE CATALOG | | 96 |
| 19 | TRANSFORMER CATALOG | | 21 |

[→] [↑] [→] [↑↑] [MARK] [«OTHER FUNCTION»] [IMAGE DISPLAY] [RETURN]

FIG. 27

| NUMBER | DOCUMENT NAME | GRAPHIC DOCUMENT NAME | NUMBER OF PAGES |
|---|---|---|---|
| | TOTAL NUMBER OF FILES = 38 | TOTAL NUMBER OF IMAGES = 3456 | 1993 - 06 - 24  20:12 |
| 1 | MINUTES OF FIRST PREVIOUS ARRANGEMENT OF BUDGET | | 4 |
| 2 | ORDER SLIP NO.123 ~ 456 | | 334 |
| 3 | PERIPHERAL EQUIPMENT CATALOG | | 42 |
| 4 | EXPERIMENT REPORT NO.53 | EXPERIMENT REPORT NO.53 | 34 |
| 5 | SCHEDULE TABLE OF YEAR | | 2 |
| 6 | WRITTEN REQUEST OF EQUIPMENT PURCHASE | | 432 |
| 7 | ORDER SLIP NO.457 ~ 789 | | 222 |
| 8 | BUDGET APPLICATION OF LATTER HALF | | 65 |
| 9 | PATENT ABSTRACT OF 1993 | | 23 |
| 10 | ION BLADING EXPERIMENT | | 15 |
| 11 | CVD EXPERIMENT | | 48 |
| 12 | RESULT OF BUDGET DELIBERATION OF 1993 | | 02 |
| 13 | SALES REPORT OF FIRST HALF OF 1993 | | 15 |
| 14 | ORDER SLIP NO.800 ~ 820 | | 47 |
| 15 | DISC DRIVE CATALOG | | 63 |
| 16 | PARTS DRAWING NO.12345 | | 25 |
| 17 | CARTRIDGE CATALOG | | 48 |
| 18 | POWER SOURCE CATALOG | | 96 |
| 19 | TRANSFORMER CATALOG | | 21 |

→  ↓  ↑  ↑↓  ↑  MARK  ≪OTHER FUNCTION≫  IMAGE DISPLAY  RETURN

IMAGE FILING APPARATUS AND METHOD FOR DISPLAYING A RETRIEVAL RESULT LIST REPRESENTING THE RETRIEVAL OF A STORED DOCUMENT IMAGE OR FOR DISPLAYING THE INDEX OF A DOCUMENT IMAGE RETRIEVED BY RETRIEVAL MEANS

This application is a continuation of application Ser. No. 08/350,108, filed Nov. 29, 1994, now abandoned.

BACKGROUND OF THE INVENTION

1. Field of the Invention

The invention relates to an image filing apparatus to store an image in a memory medium.

2. Related Background Art

Hitherto, there exists a document image information processing apparatus in which document information, called an electronic file or the like, is converted to electrical information by a photoelectric converting device such as a CCD or the like, the electrical information is stored in a memory medium, such as an optical disc or the like, and the information in the memory medium is retrieved later and is displayed by a display device or is outputted to a printer or the like.

In such an apparatus, generally, when a document is read, a key word such as a document name or the like is inputted as an index by the operator from a keyboard or the like, associated with the apparatus, thereby preparing for a subsequent retrieval.

In a conventional document image information processing apparatus as mentioned above, when the document is read, the operator needs to input a key word such as a document name or the like from the keyboard or the like. First, the operator who is not familiar with the keyboard has to execute a troublesome work each time one document is read.

The conventional document image information processing apparatus also has the following problems.

A time point for a document, namely, the point in time when the user himself forms a document or when he reads the received document is generally the time at which the most proper index can be presumed. However, the document cannot always be conveniently read from the apparatus at such a time point.

That is, such a situation occurs in the case where the apparatus is installed at a remote location, where another user uses the apparatus, where there is no time to perform the reading operation, or the like. In such a case, the document is read from the apparatus at a time point after the time point when the document was created or previously read.

Since the document name or index is inputted from the keyboard or the like at a time point when the document is read from the apparatus as mentioned above, in case of reading the document from the apparatus with a time delay from the time point of the creation or previous reading of the document as mentioned above, it is difficult to add the optimum index to the document. Thus, it is necessary to again read the document for only the purpose to consider the index.

SUMMARY OF THE INVENTION

It is an object of the invention to provide an image filing apparatus which can eliminate the drawbacks mentioned above.

Another object of the invention is to provide an image filing apparatus which can fetch a document name or the like as an image and can display a retrieval result list which can be easily used.

Still another object of the invention is to provide an image filing apparatus which can easily add temporary index information.

Another object of the invention is to provide an image filing apparatus which can efficiently retrieve without forming an unnecessary display area in a display of a retrieval result.

Another object of the invention is to provide an image filing apparatus which can easily add a proper index.

The above and other objects and features of the present invention will become apparent from the following detailed description and the appended claims with reference to the accompanying drawings.

BRIEF DESCRIPTION OF THE DRAWINGS

FIG. 4 is a front view showing a batch display of graphic document names in the embodiment;

FIG. 12 is an explanatory diagram showing a document management file in the embodiment;

FIG. 13 is an explanatory diagram showing a page management file in the embodiment;

FIG. 14 is an explanatory diagram showing a node table in the embodiment;

FIG. 17 is an explanatory diagram showing an FAT in the embodiment;

FIG. 18 is an explanatory diagram showing a document management file in the second embodiment of the invention;

FIG. 19 is an explanatory diagram showing a document management file in the third embodiment of the invention;

FIG. 20 is an explanatory diagram showing a document management file in the fourth embodiment of the invention;

FIG. 21 is an explanatory diagram showing a display state of a retrieval result list in the embodiment;

FIG. 22 is an explanatory diagram showing a display state of an image file retrieved by the retrieving operation in the embodiment;

FIG. 23 is an explanatory diagram showing a document management file after a character code document name was added later in the embodiment;

FIG. 24 is an explanatory diagram showing a display state of a retrieval result list after a character code document name was added later in the embodiment;

FIG. 26 is an explanatory diagram showing an example of a display state of the retrieval result list according to the embodiment;

FIG. 27 is an explanatory diagram showing an example of a display state of the retrieval result list according to the embodiment.

DETAILED DESCRIPTION OF THE PREFERRED EMBODIMENTS

Figure 6:
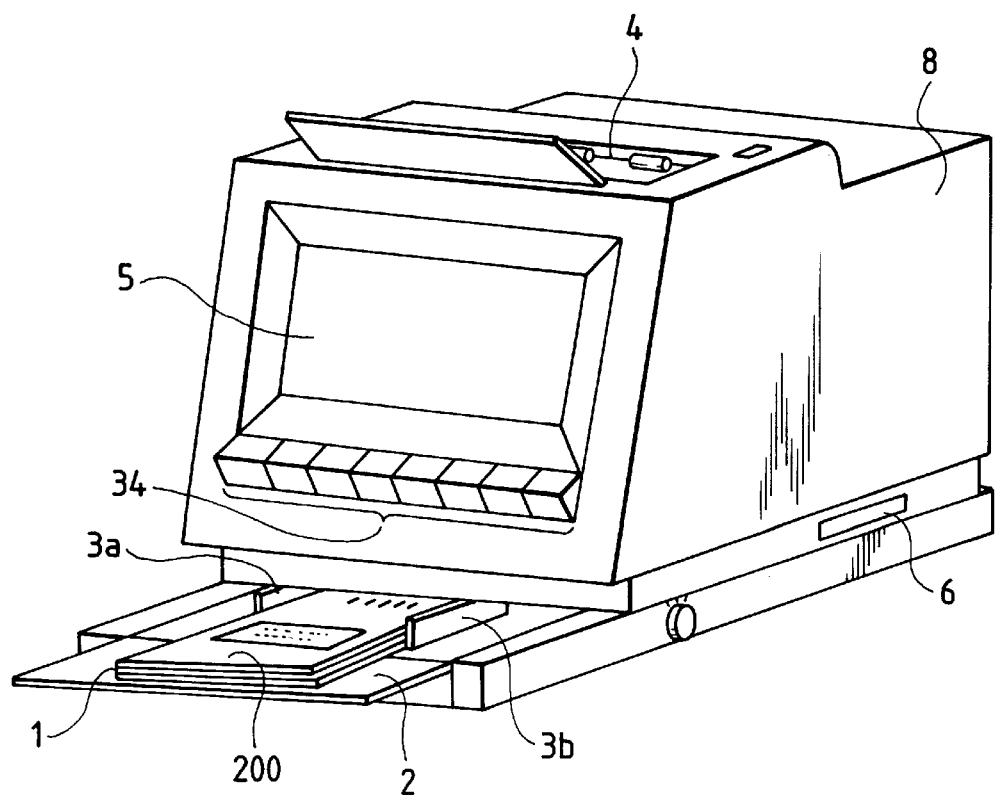
FIG. 6 is a perspective view showing an external view of an image filing apparatus in the embodiment.
Figure 7:
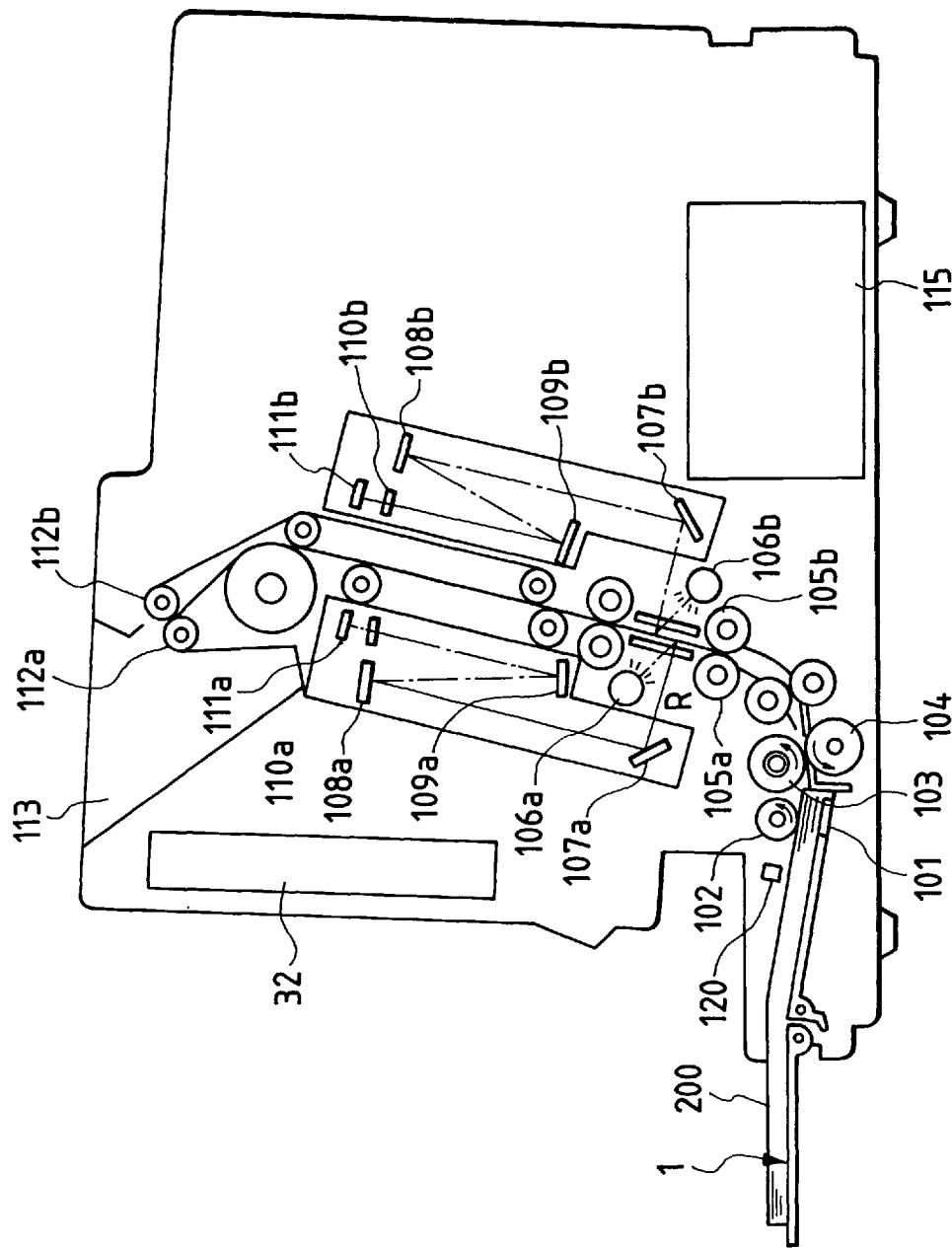
FIG. 7 is a vertical sectional view showing the internal structure of the image filing apparatus in the embodiment.
Figure 8:
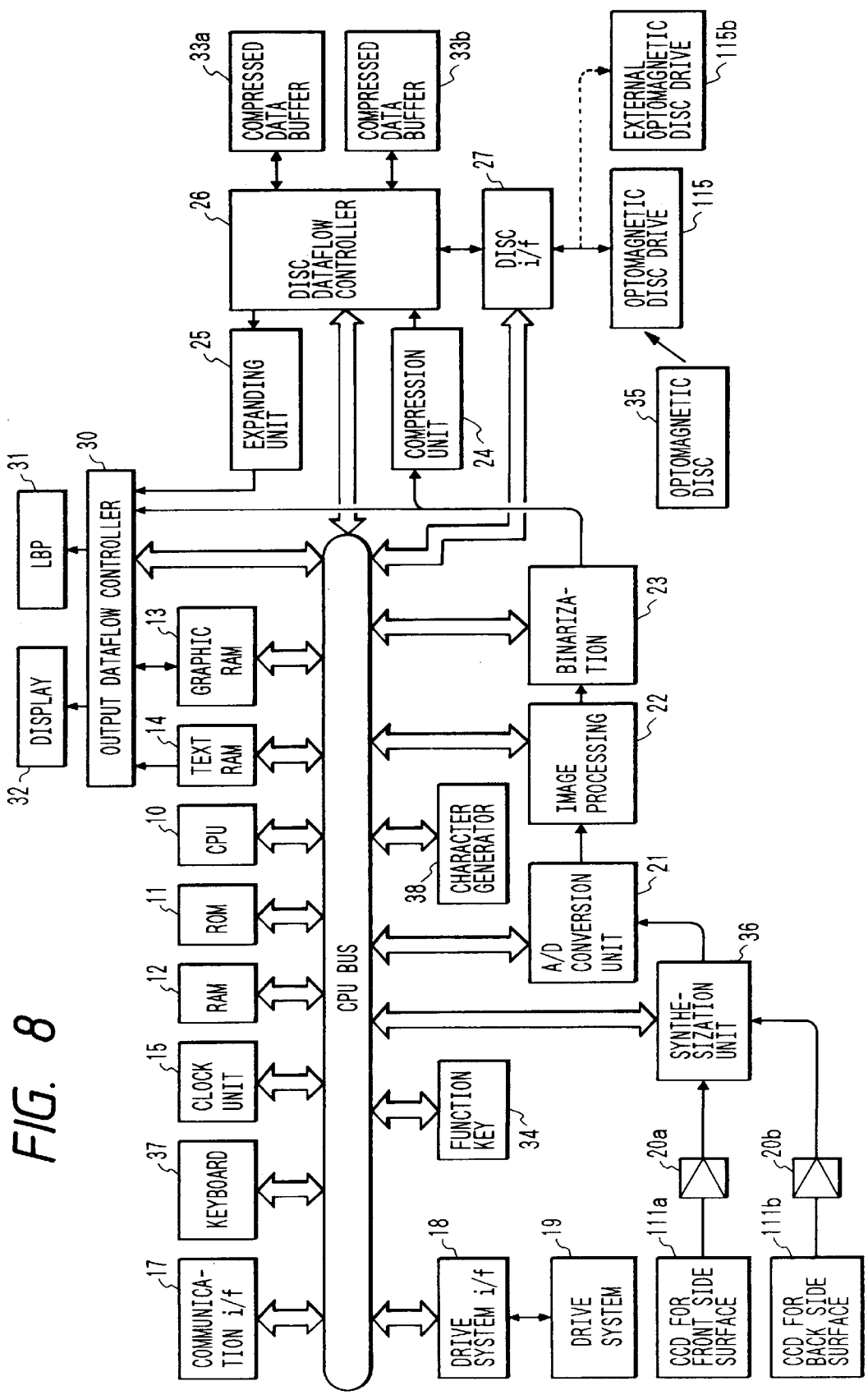
FIG. 8 is a block diagram showing the construction of the image filing apparatus in the embodiment.

FIG. 6 is a perspective view showing an external view of an image filing apparatus according to an embodiment of the invention. FIG. 7 is a vertical sectional view showing the internal structure of the image filing apparatus. FIG. 8 is a block diagram showing the construction of a control circuit of the image filing apparatus.

In FIG. 6, a bundle of originals 1 is put on an original supporting plate 2 and is sandwiched by guiding plates 3a and 3b for guiding the conveyance of the original. A paper delivery section 4 is provided above the image filing apparatus. A screen 5 to display image information, an operating instruction, or the like is provided at the front side of the apparatus. An inserting port 6 to insert a magnetooptic disc (optomagnetic disc) 35 (shown in FIG. 8) on which an image is stored is formed in the side surface of the apparatus.

The registration of an image index will now be described.

First, prior to recording an actual original image, a symbolic image (image index) regarding the original to be recorded is previously recorded on the magnetooptic disc 35 (shown in FIG. 8).

Figure 9:
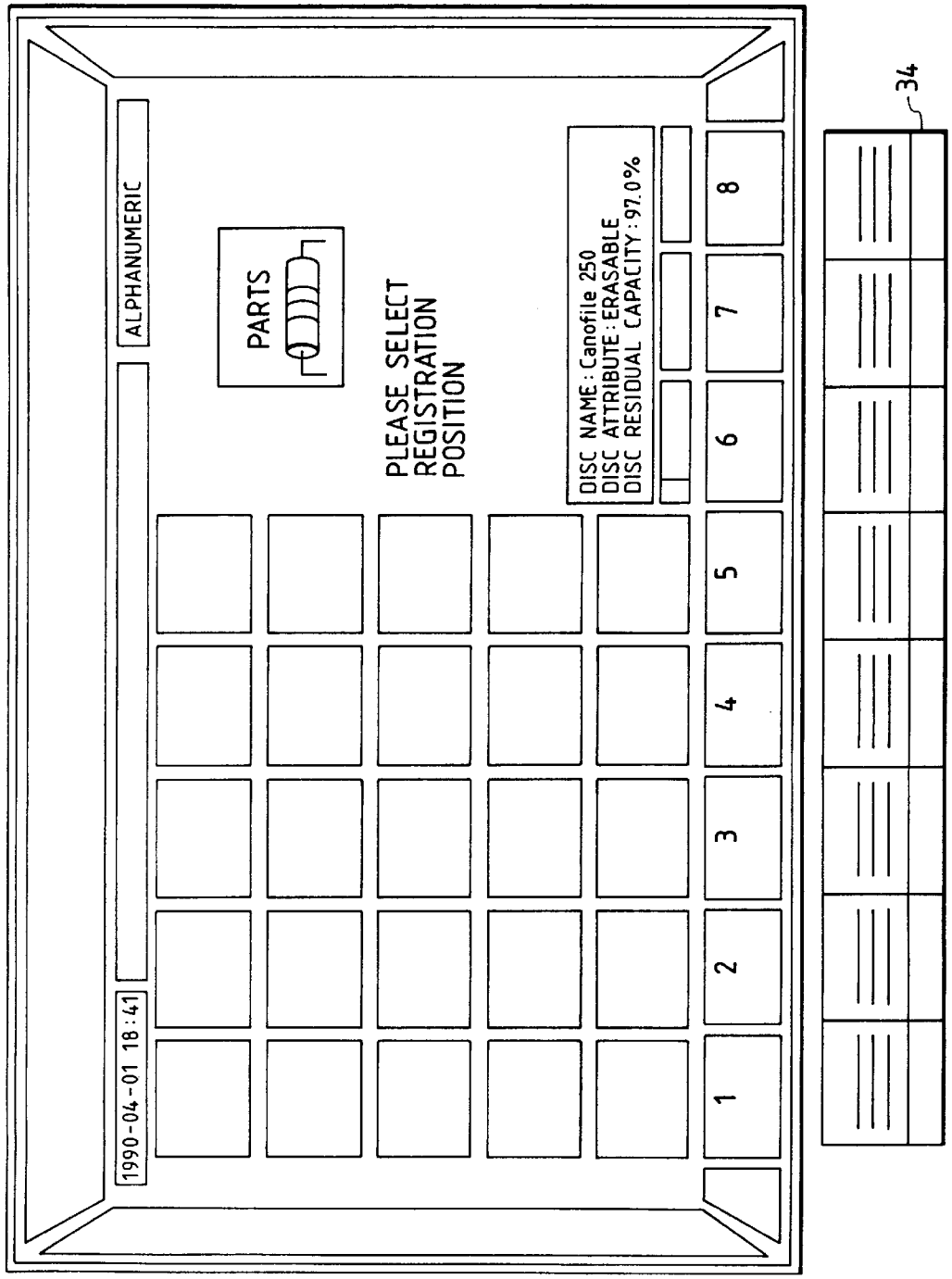
FIG. 9 is a front view showing a display state of an index image including a character image in the embodiment.

In a manner similar to the recording of the original image, which will be explained hereinlater, in the above operation, the original on which one index image has been recorded is read and, as shown in FIG. 9, an index image indicative of, for example, "parts" is displayed in the right upper portion of the screen. The position at which the operator wants to display the index image is designated by using a function key 34.

In FIG. 9, function keys are arranged in a line in the lateral direction and they are constructed such that by depressing twice, for example, the leftmost function key (a character of "1" is written), the second position from the left upper position can be designated.

Figure 11:
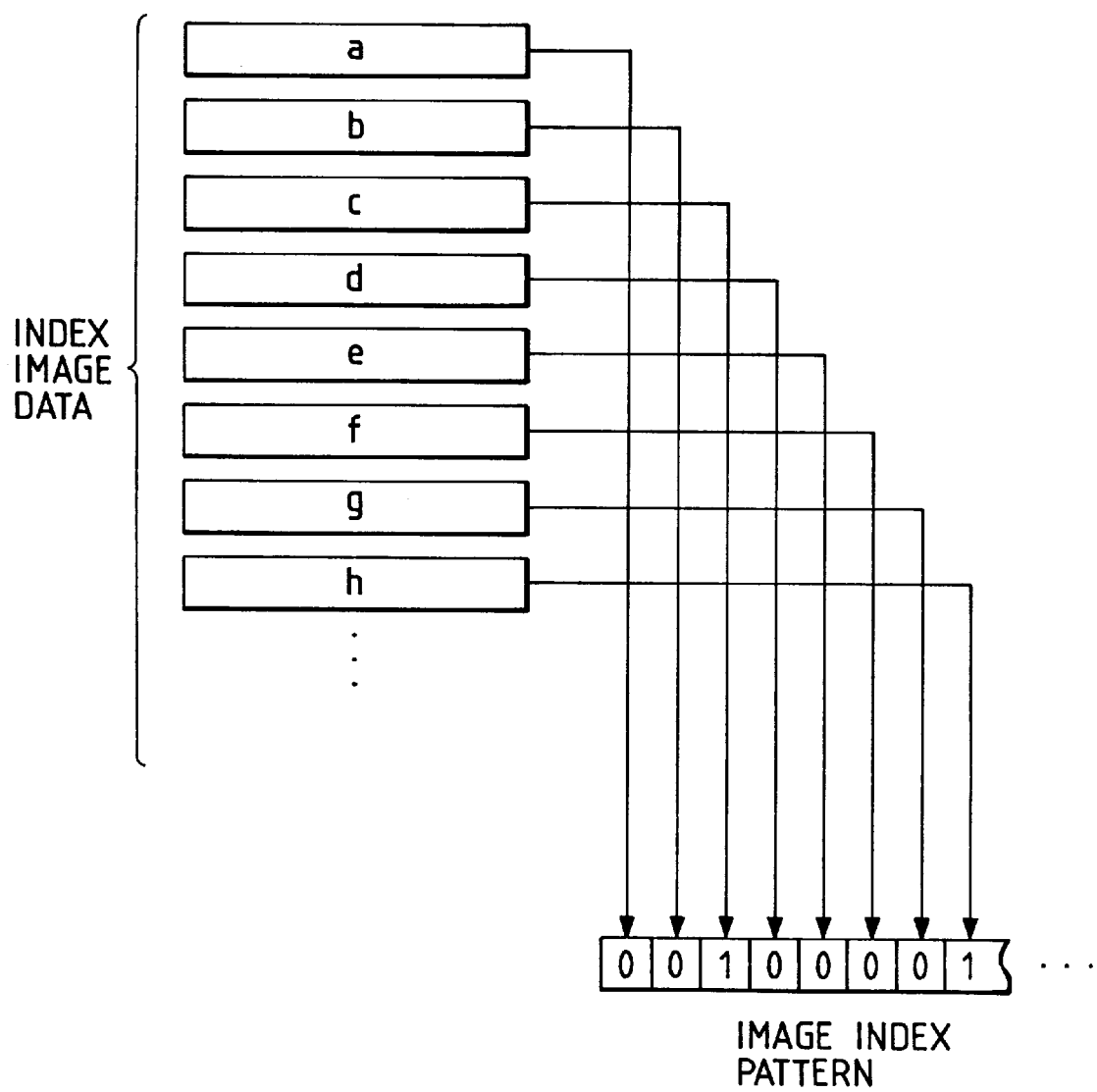
FIG. 11 is a block diagram showing the construction of an index image data file in the embodiment.

When a plurality of image indices are recorded on the magnetooptic disc 35 (shown in FIG. 8), an index image data file is formed on the magnetooptic disc 35 (shown in FIG. 8) as shown in FIG. 11.

The date and time at which the index image data file was formed is referred to as an image index date. The image index date is converted to a code and written into a special area on the magnetooptic disc 35 (shown in FIG. 8).

Figure 10:
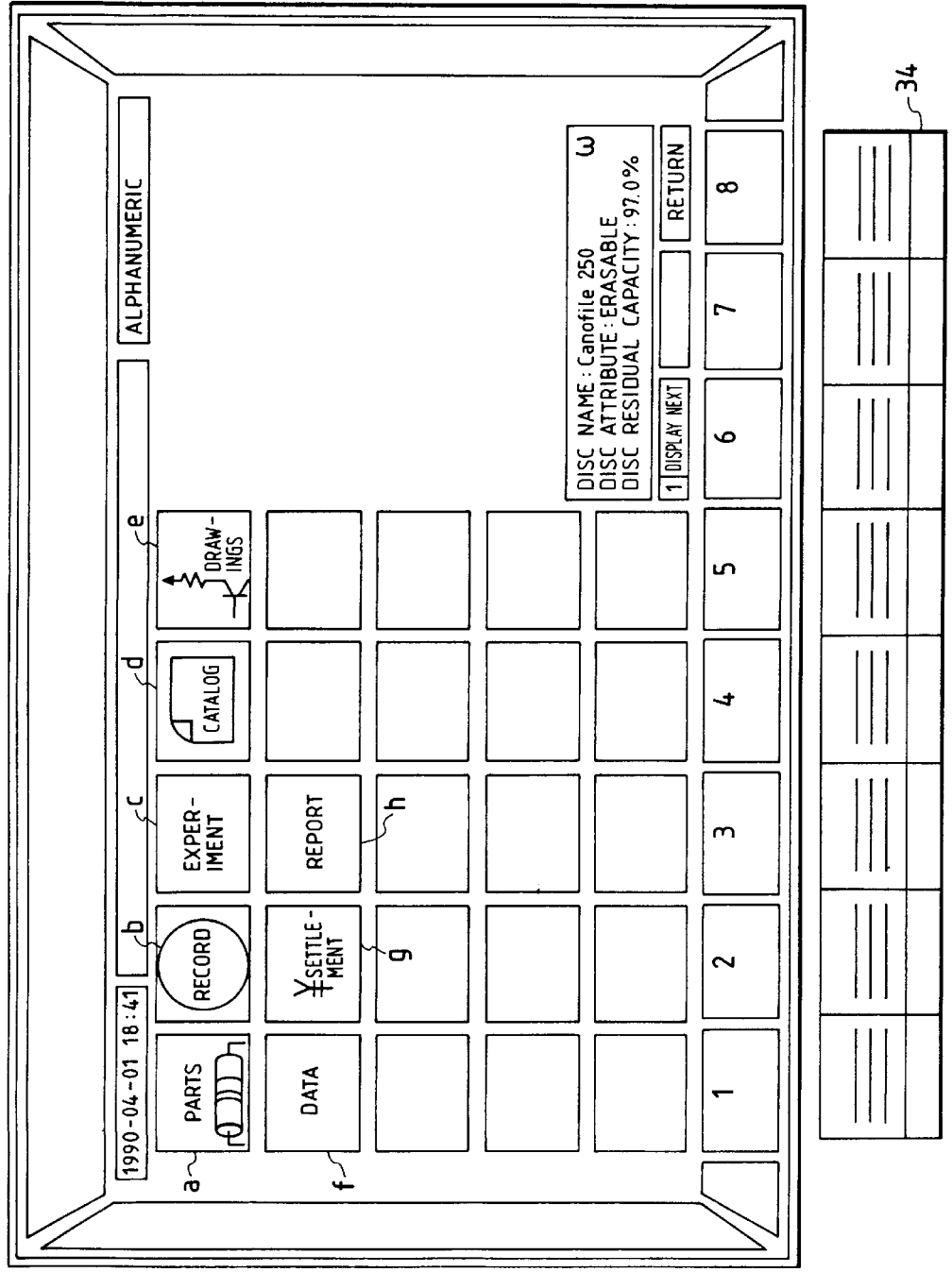
FIG. 10 is a front view showing an image index display at the time of retrieval in the embodiment.

In the case where the index image which has already been registered is changed or erased and the index image is moved or the like, for example, when image indices (a) and (b) are exchanged in FIG. 10 or the like, the image index date on the magnetooptic disc 35 (shown in FIG. 8) is updated.

The above control is performed by a CPU 10 and an ROM 11 (shown in FIG. 8) in which commands for allowing the CPU 10 to execute the above control were written.

The formation of a document name registration sheet will now be described.

The document name registration sheet is formed by index sheet forming means comprising the CPU 10 to execute controls, which will be explained hereinbelow, and the ROM 11 in which the commands to allow the CPU 10 to execute the controls, which will be explained hereinlater, were written.

Figure 2:
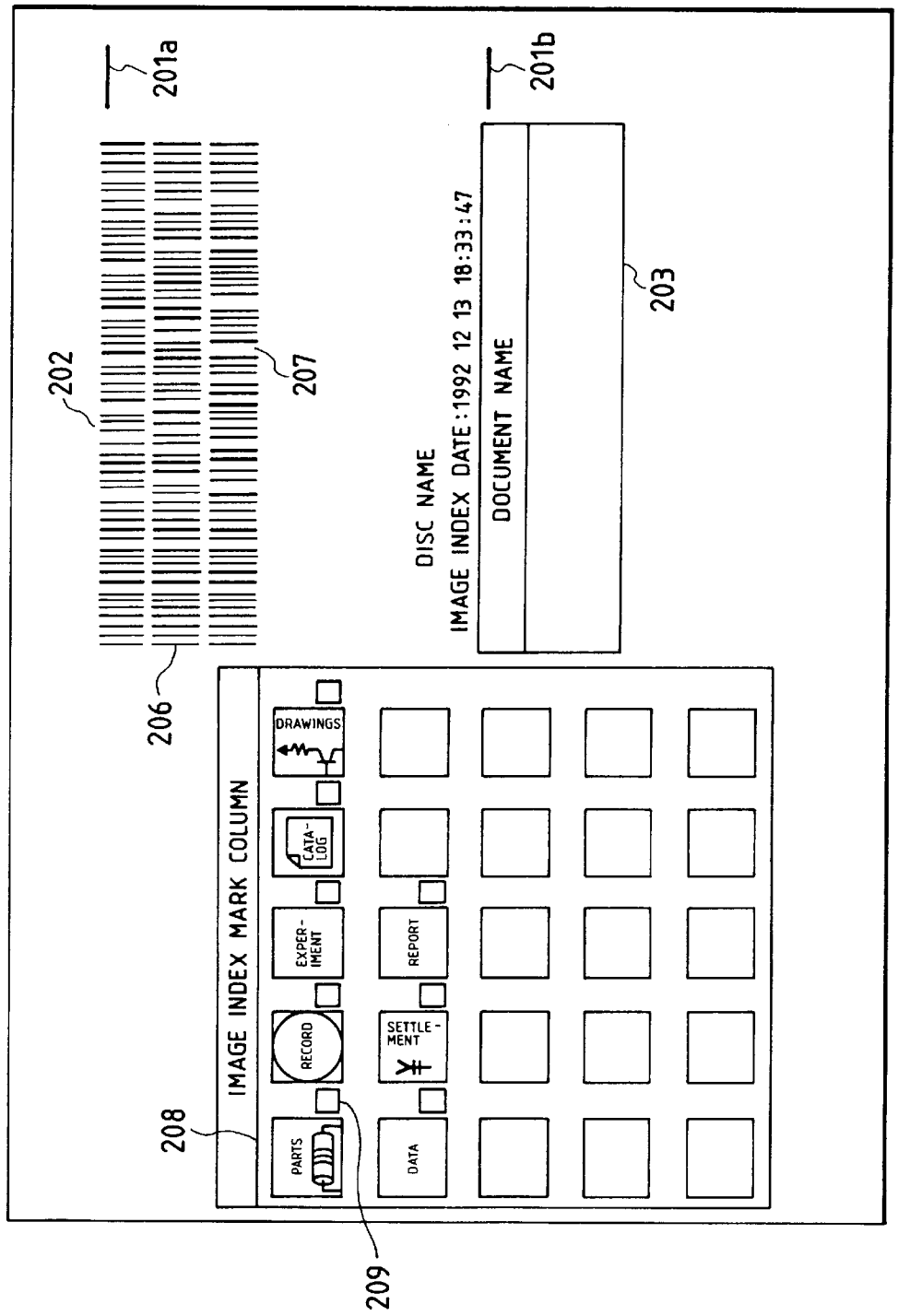
FIG. 2 is a plan view showing the document name registration sheet in the embodiment.

FIG. 2 is a plan view showing a document name registration sheet.

Reference marks 201a and 201b are marks to detect the degree of positional deviation, such as oblique movement of the sheet which occurs when the document registration sheet is read or the like, as will be explained hereinlater. A bar code 202 comprises a sheet ID (identification) code to judge that the read sheet is the document name registration sheet when the document registration sheet is read as will be explained hereinlater.

A disc ID to discriminate the magnetooptic disc has been written in a special area on the magnetooptic disc 35. A bar code 206 is formed by reading out the disc ID from the magnetooptic disc 35 which has already been loaded at a time point of the formation of the document name registration sheet and by drawing the disc ID by a bar pattern.

The image index date read out from the magnetooptic disc 35 which has already been loaded at the time point at which the document name registration sheet was created is drawn as a bar code 207.

As an image index mark column 208, the image index written on the magnetooptic disc 35 loaded at that time point is drawn. A mark frame 209 to write a check mark to select the image index is drawn at the existing position of the image index.

When the operator instructs the CPU 10 to form the document name registration sheet by operating the function key 34, the CPU 10 writes the image information based on the information such as image index, disc ID, image index date, etc. mentioned above, which were read out from the magnetooptic disc 35, onto a graphic RAM 13. The CPU 10 transfers the contents in the graphic RAM 13 to a printer 31 such as an LBP (laser beam printer) or the like through an output data flow controller 30, so that the document name registration sheet is formed.

Writing to the document name registration sheet will now be described.

As mentioned above, as for a document name registration sheet 200, a document name which is conveniently used when retrieving the original later is written into a document name column 203 of the paper shown in FIG. 2 and formed by the image filing apparatus itself. The operator writes an "x" mark into the mark frame 209 associated with the image index to be added to the original.

Figure 1:
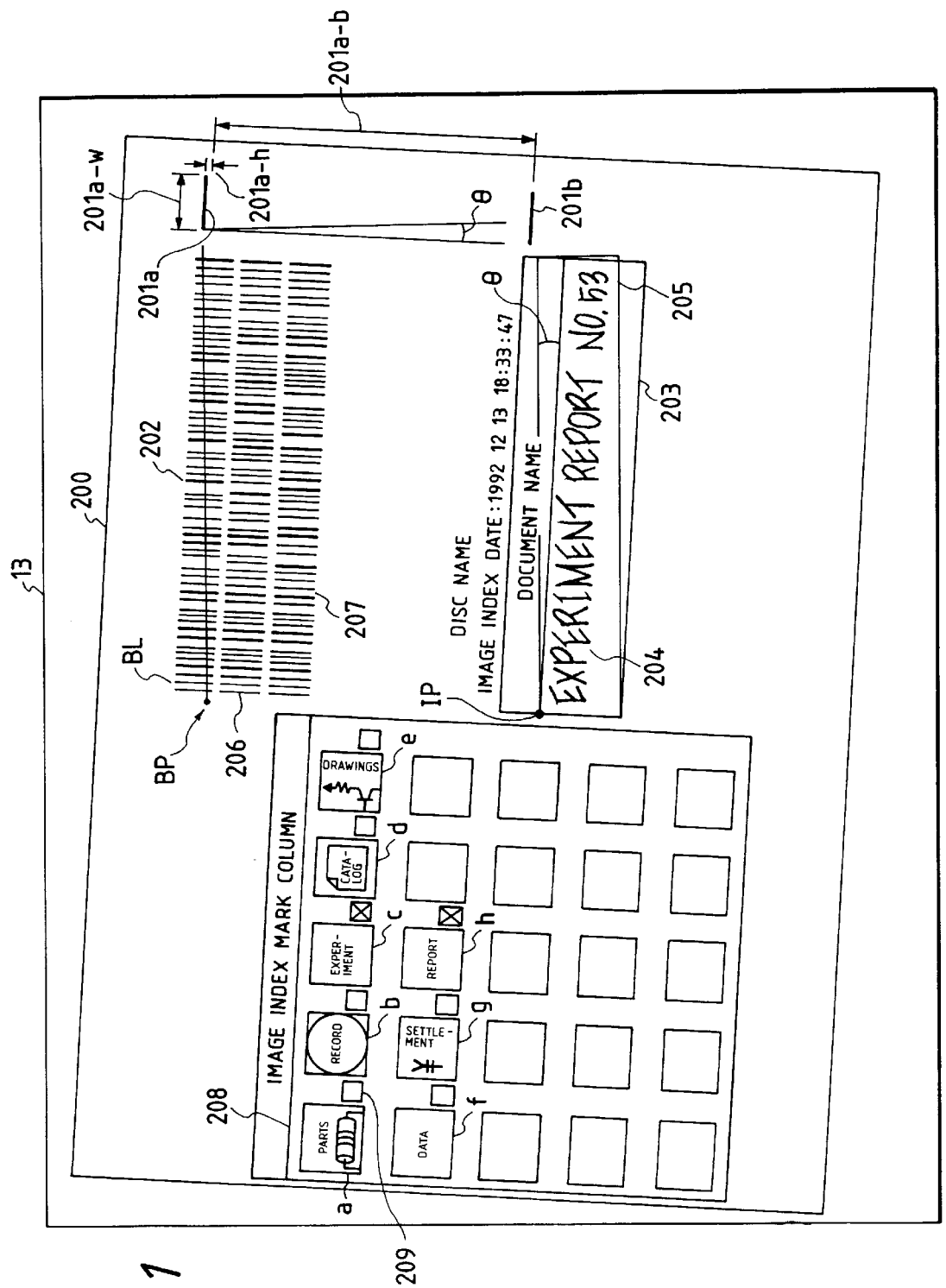
FIG. 1 is an explanatory diagram showing a situation in which a written document name registration sheet has been stored in a graphic RAM in an embodiment of the invention.

In the example of FIG. 1, a document name of "Experiment report No. 53" is written in the document name column by hand and marks are added to image indices (c) and (h) indicative of "report" and "experiment".

Since the information to be written into the document name column is processed as image information as will be explained hereinlater, it may be a figure or the like other than characters.

The document recording operation will now be described.

When a document is recorded, as shown in FIG. 6, the bundle of originals 1 is put on the original supporting plate 2. When the operator gives an instruction for the recording operation by depressing the function key 34, the conveyance of the original is started.

The document name registration sheet 200 as index means shown in FIG. 1 is stacked at the head of the original bundle 1.

When the recording operation is started, a feed roller 102 is first rotated in the direction shown by an arrow, thereby feeding the original to a separation unit. The separation unit comprises a paper feed roller 103 and a separating roller 104 and rotate counterclockwise, respectively. The front layer portion (the top original) of the original bundle is first fed and the other originals are left on the original supporting plate 2 by an interval between the paper feed roller 103 and the separating roller 104 and by a frictional force with the separating roller 104.

The original which was first fed reaches a reading unit by conveying rollers 105 (105a and 105b). In the example shown here, the image information of the original illuminated by an illuminating lamp 106 is reduced by a lens 110 through mirrors 107 to 109 (107a ... 109b) and is read by a CCD 111 as reading means. The apparatus of the embodiment can simultaneously read the images on both sides of the original.

After completion of the reading operation, the original is stacked onto a paper delivery tray 113 by paper delivery rollers 112 (112a, 112b).

The above processes are continuously executed and are finished when an original sensor 120 detects that no original is left on an original supporting plate 101.

A drive system 19 has the above-mentioned original sensor 120 and a motor (not shown). The conveyance mentioned above is executed by controlling the drive system 19 by the CPU 10 through a drive system interface 18.

The image signals read by a CCD 111a for the front side surface and a CCD 111b for the back side surface are transmitted through amplifiers 20a and 20b and are sent to a synthesization unit 36, respectively.

The synthesization unit 36 has a function such that when the data of an amount of one main scan line is supplied from the CCD 111a for the front side surface to the next stage, an internal switching device is switched and the image data of the amount of one main scan line is subsequently transmitted from the CCD 111b for the back side surface to the next stage.

As mentioned above, the image data of both of the front and back side surfaces is converted to serial data on a unit basis of one main scan line and is sent to a compression unit at the next stage.

The operation to read both side surfaces has been described above. In the case where the operation to read one side surface is instructed to the synthesization unit 36 by an instruction of the CPU 10, however, the foregoing switching is not executed but the image data from the CCD 111a for the front side surface is always sent to the next stage.

After the image signal from the synthesization unit 36 is quantized by an A/D conversion unit 21, image processes such as an edge emphasis and the like are executed by an image processing unit 22. The processed image data is binarized to become data of the form (1, 0) by a binarization circuit 23.

One of the binary image data is stored in bit map form in the graphic RAM 13 and the other is subjected to a well-known image information compression such as MH, MR, MMR, or the like by a compression unit 24. After that, the compressed data is stored in a compressed data buffer 33a or 33b.

The data stored in the graphic RAM 13 is displayed on the display by the output data flow controller 30.

The detecting operation of the document name registration sheet will now be described.

The detection such that the image information read as mentioned above is the image information of the document name registration sheet is performed by the CPU 10.

FIG. 1 is an explanatory diagram showing a situation in which the written document name registration sheet has been stored in a bit map format in the graphic RAM 13. The diagram shows a state in which the document name registration sheet was conveyed in a state in which is was inclined by only θ.

There is a possibility that the reference mark 201a in FIG. 1 is written in an address of an area in the graphic RAM 13 in the case where the read original is the document name registration sheet 200 and a width 201a–w and a height 201a–h of the reference mark 201a shown in FIG. 1 have been stored in the ROM 11.

The CPU 10, therefore, reads out the above address, width, and height from the ROM 11 and discriminates whether a black image having such width and height exists in the foregoing address area in the graphic RAM 13 or not.

In the case where such a black image is not found out, the original is processes as an ordinary original.

When such a black image is detected, the detection of another reference mark 201b which ought to exist near a predetermined coordinate position such that the center point (such a point is referred to as a representative point of the reference mark hereinbelow), for example, in the vertical direction at the left edge of a rectangle of the reference mark 201a detected is set to an origin is subsequently started.

The above predetermined coordinate position is a position which was moved in the vertical direction shown at 201a–b in FIG. 1 in the embodiment. Such coordinates have also been stored in the ROM 11.

In a manner similar to the above, when the reference mark 201b is not detected, the original is processed as an ordinary original.

When the reference mark 201b is detected, as shown by θ in FIG. 1, an angle of inclination of the image is obtained from deviation lengths in the horizontal direction of the representative points of the two reference marks 201a and 201b.

Since the coordinates of the center point of the bar code 202 in which the representative point of the reference mark 201a is set to the origin have been stored in the ROM 11, those coordinate values are read out and are rotated by only the angle of θ. Subsequently, a point BP which was moved to the left by a distance of only ½ of the length in the horizontal direction of the bar code 202, also stored in the ROM 11, is set to a decoding start point of the bar code 202.

Subsequently, the bar code 202 is decoded with respect to a line on the graphic RAM 13 shown from the BP to BL in FIG. 1.

When the decoding of the bar code 202 is not normally finished, the original is processed as an ordinary original.

When the decoding is normally finished, the decoding result is collated with the sheet ID stored in the ROM 11. The CPU 10 then recognizes that the sheet is the document name registration sheet.

The analyzing operation of the document name registration sheet will now be described.

The bar codes 206 and 207 are decoded by a method similar to the bar code 202. When the disc ID and index date stored on the magnetooptic disc 35 mentioned above don't coincide with the results of the decoding of the bar codes 206 and 207, the reading operation is stopped by regarding it as an error.

When they coincide, the judgment of the image index mark column 208 is started. In a manner similar to the method mentioned above, the relative coordinates from each of the reference marks 201a and 201b in the mark frames stored in the ROM 11 are rotated by an angle of θ, the position of each mark frame is calculated, and the number of black pixels in each mark frame is counted. When the count result is equal to or larger than a predetermined value, it is judged that the mark such as "x" or the like was marked in the mark frame.

In the example of FIG. 1, it is recognized that the marks of the mark columns exist in the image indices (c) and (h). An image index pattern, such that the bit position, corresponding to the marked index image as shown in FIG. 11, is set to "1", is formed.

The extracting operation of the graphic document name will now be described.

First, the image in the document name column is extracted. The extracting operation is executed by the CPU 10.

In the embodiment, the coordinates at the left upper point of the document name column in which the reference mark 201b is set to the origin are read out from the ROM 11. The coordinates are rotated by an angle of θ as mentioned above and the coordinates of a left upper point IP of the document name column are calculated.

Figure 3:
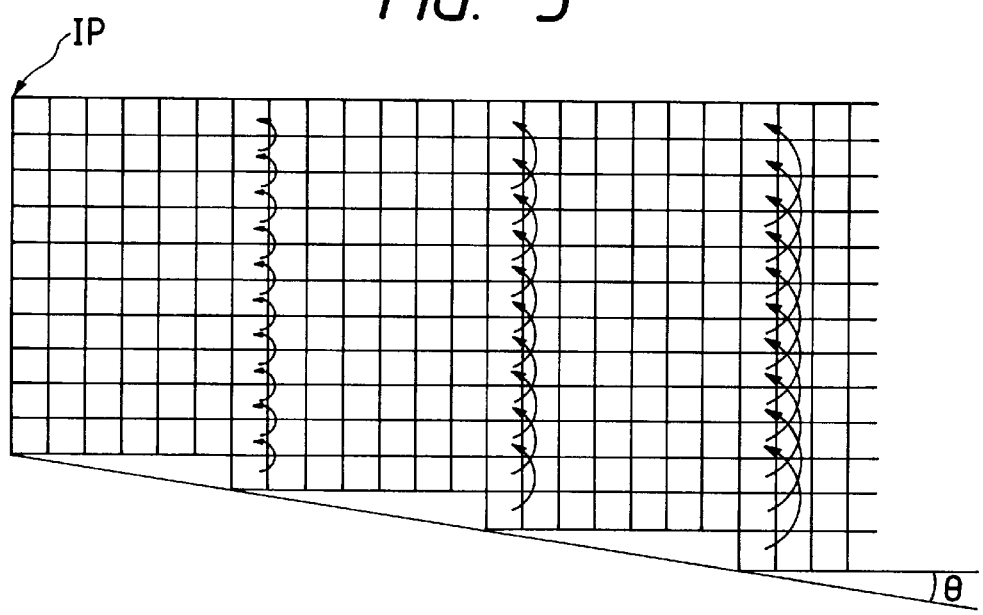
FIG. 3 is an explanatory diagram showing a method of the image operation in the embodiment.

The image in the document name column is subsequently extracted. In this instance, an oblique movement of the sheet is corrected for the image information of the document name column. That is, as shown in FIG. 3, an image process is executed in a manner such that by shifting the pixels in the vertical direction each time the sheet advances by a distance of only the pixels corresponding to the angle θ in the horizontal direction, the written document name lies within a horizontal rectangular area, namely, a document name column area shown at 205 in FIG. 1.

The image in the document name area 205 on the graphic RAM 13 is subsequently sent to a magnetooptic disc drive 115 through a disc interface 27 and is written as a graphic document name onto the magnetooptic disc. The above process is executed by the CPU 10.

By analysis of the graphic RAM 13 by the CPU 10 mentioned above, when it is judged that the read original is not the document name registration sheet, the compressed image data stored in the compressed data buffer 33a or 33b is supplied to the magnetooptic disc drive 115 through the disc interface 27 and is written as a document image onto the magnetooptic disc. The position at which the compressed image data was written on the magnetooptic disc 35 is recorded as a node, which will be explained hereinlater, onto a page management file, which will be explained hereinlater.

The reason why two compressed data buffers 33a and 33b are provided is because even for a period of time when the compressed image data in the compressed data buffer 33a is written to the magnetooptic disc, the next original is scanned and the compressed data thereof is stored in the compressed data buffer 33b.

Consequently, a limitation such that a system must wait for the scan of the next original until the end of the writing of the image data of the previous original onto the magnetooptic disc is avoided. The recording efficiency of the original is, therefore, improved.

At a time point when the graphic document name is written onto the magnetooptic disc 35 and the recording operation of the original as mentioned above is subsequently executed and the recording of the document is finished, the record of the document recorded at that time is formed in the document management file (FIG. 12) stored on the magnetooptic disc 35. The storage location on the magnetooptic disc 35 of the image data of the graphic document name is written as a node, which will be explained hereinlater, in the column of the graphic document name node.

Figure 5:
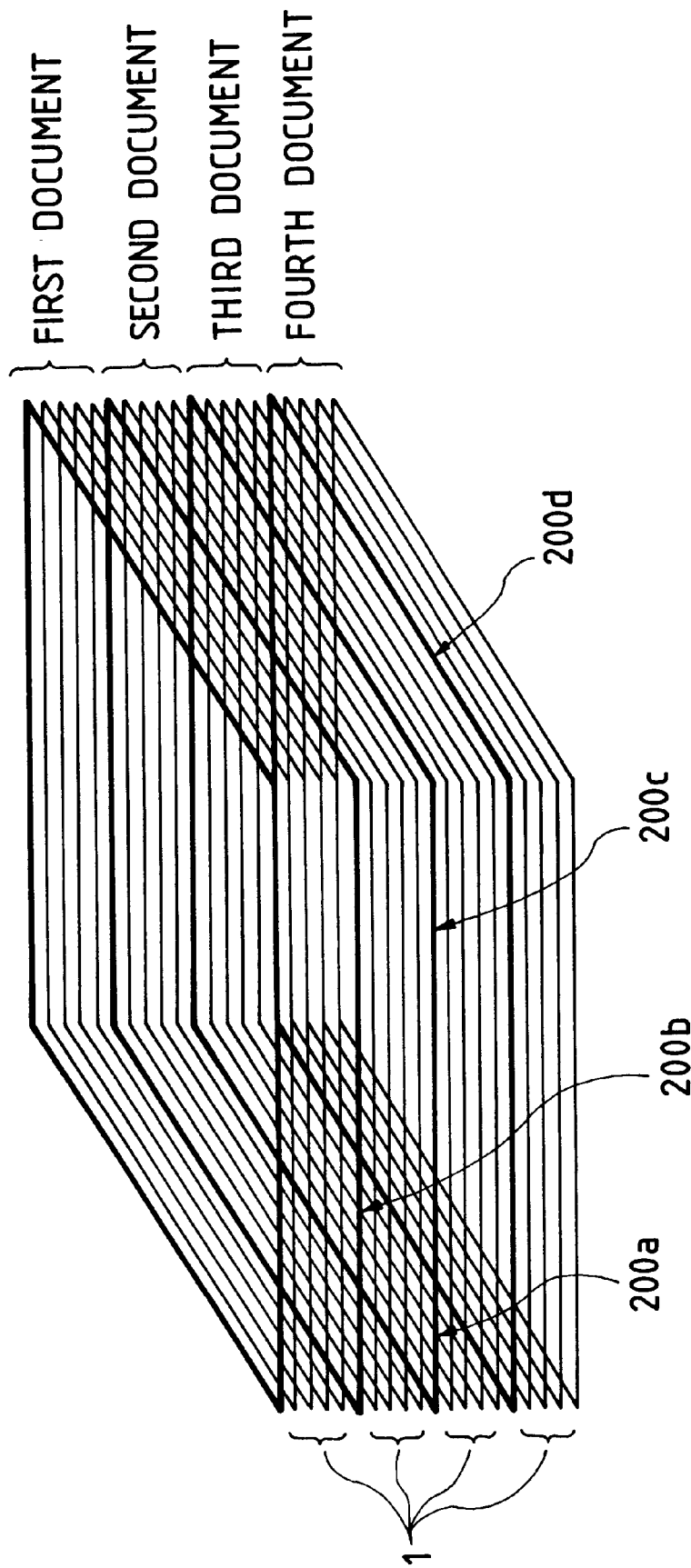
FIG. 5 is a perspective view showing an original in the case of reading in a batch a plurality of documents each including a document name registration sheet at each head page in the embodiment.

As shown in FIG. 5, it is also possible to construct the device in a manner such that a plurality of documents each including the document name registration sheet at the head page are put on the original supporting plate 2 in a batch and the plurality of documents are read in a batch. That is, since the detecting operation of the document name registration sheet as mentioned above is executed for all of the originals, when the second document name registration sheet is detected, a new record is formed in the document management file. Therefore, the first, second, third, and fourth documents can be partitioned by the document name registration sheets.

The node and FAT will now be described.

In the embodiment, the storage location of the image data on the magnetooptic disc is managed by a data table called a node table shown in FIG. 14. The node table is stored on the magnetooptic disc 35.

Figures 15, 16:
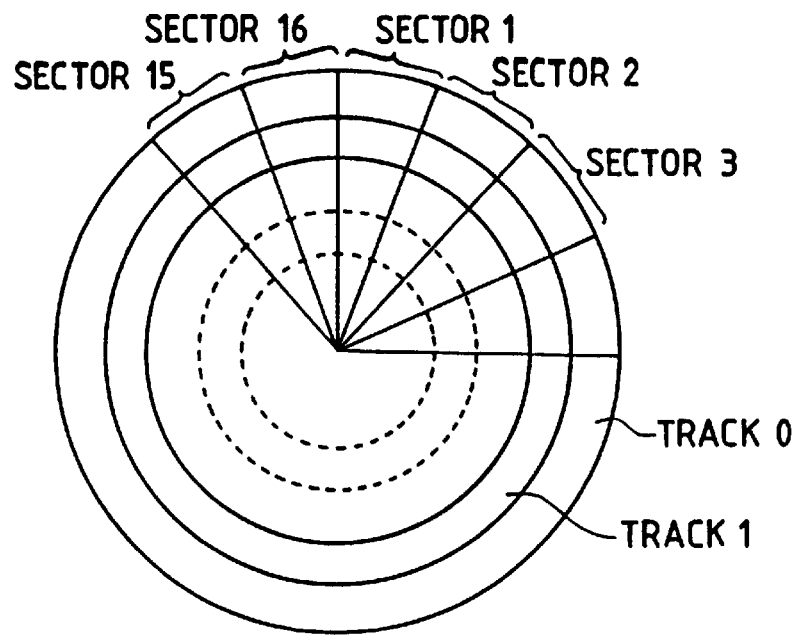
FIG. 15 is an explanatory diagram showing a storage area of a magnetooptic disc in the embodiment.
FIG. 16 is an explanatory diagram showing the correspondence relation between the logical address and the physical address in the embodiment.

An FAT entry in FIG. 14 will now be described. FIG. 15 shows a storage area in the medium of the magnetooptic disc 35. Such a disc is divided by physical divisions called tracks and sectors. Such a physical division is hereinafter referred to as a physical address.

In the magnetooptic disc drive 115, the area to store or read out the information is designated by the physical address. Generally, in a CPU unit, each area is managed by a logical area division called a well-known cluster. The position information of the logical area division is hereinafter called a logical address.

In such system, the correspondence between the logical address and the physical address is unconditionally determined as shown in FIG. 16. The determination of the logical address is substantially equivalent to the decision of the physical address.

A list of the information indicating that an area designated by the logical address is in which one of the states of "unused areas", "used areas", and "erased areas", has been stored on a certain fixed physical address on the medium.

In the embodiment, when the cluster is not used yet, FFFF is written. When the cluster is in the erased state, FFFE is written. When the cluster is the last cluster of the file, 0000 is written. Further, when there is another cluster subsequent to the cluster, the logical address of the subsequent cluster is written.

The difference between the erased state and the unused state will now be described. The unused state is a state in which no meaningful information exists in the area shown by the logical address. The erased state is a state which appears after the erasing operation of the file was performed. In the erased state, information still exists in the area shown by the logical address.

The management of the cluster mentioned above is generally performed by a table called an FAT (File Allocation Table). FIG. 17 shows such an FAT.

The upper stage of FIG. 17 shows the logical address. Information indicating that the logical address is in the unused state or used state is written at the lower stage.

FIG. 17 shows the logical addresses (62B0 to 62BA) have already been used and that the logical address (from 62BB) are not used.

62AD to 62AF indicate the portions which were erased later.

The foregoing node table is a table in which an FAT entry (62B0 in the above example), indicating which position in the FAT relates to which image data and the size (the number of bytes) of the compressed image data, are set to one record. An amount indicative of the number of record in the node table is referred to as a "node". The "node" is written in the column of node of the page management file, which will be explained hereinlater, for every page of the original or is written in the graphic document name node column in FIG. 12 mentioned above every document.

The document management file and the page management file will now be described.

The make-up date (recording date), the total number of pages, and the like, which are outputted from a clock unit 15 in FIG. 8, are also further written in the document management file.

The information regarding each page of the recorded document is written in a page management file in FIG. 13.

"Page file pointer" in the document management file denotes that number of record in the page management file which relates to the first page of the time-counted document at that time.

Information indicating that the relevant page was read in the both-side mode or the one-side mode as mentioned above and the like has also been recorded in the record about the page.

As mentioned above, when the image data of the graphic document name and the compressed image data are written on the magnetooptic disc 35 and each record is added into the node table, the page management file, and the document management file, the recording operation of the original is finished.

The operation when the recorded image is retrieved and displayed will now be described.

The retrieving operation which will be explained hereinbelow is executed by the CPU 10.

When retrieving, a display state of FIG. 10 is displayed on a display 32. The operator selects a desired image index by using the function key 34.

In accordance with the image index selected, the CPU 10 forms the image index pattern in an RAM 12 as shown in FIG. 11.

The CPU 10 subsequently checks the document management file for every record and selects the record having the image index pattern which coincides with the index pattern in the RAM 12 mentioned above.

In the case where the selected image index is, for example, only the image index (c) showing "experiment" in FIG. 10 and the image index showing "report" is not selected, the image index pattern differs from that of FIG. 11 and the bit corresponding to (h) is equal to 0.

However, when checking the record of the document management file in FIG. 12, all of the records having the image index patterns, such that "1", have been set at the same position as the bit position at which "1" has been set in the image index pattern selected at the time of retrieval, are selected.

The batch display of the graphic document name will now be described.

The graphic document names corresponding to the plurality of documents retrieved are displayed in a batch by the display 32. The batch display operation is executed by the graphic RAM 13, output data flow controller 30, display 32, and CPU 10 for controlling them.

The CPU 10 obtains an FAT entry from the graphic document name node of the document management file selected as mentioned above to the image data of the graphic document name through the node table. The CPU 10 reads out the image data of each graphic document name from the magnetooptic disc 35 and writes into the graphic RAM 13 and displays on the display 32 through the output data flow controller 30. The make-up date, the total number of pages, and the like are also displayed. Such a display state is shown in FIG. 4.

When the operator operates the function key 34 and selects one of the documents, one the basis of the page file pointer of the selected record in the document management file, the record of the first page of the document is selected from the page management file in FIG. 13. Further, the node is specified and the FAT entry of the first page is derived from the node table.

The logical address train is obtained by tracing the FAT in FIG. 17 and the compressed image data is sequentially read out through the disc interface 27 by the disc drive 115.

In this instance, a disc data flow controller 26 sends the compressed image data from the disc interface 27 to an expanding unit 25 also under the control of the CPU 10.

In this instance, the output data flow controller 30 stores the image data form the expanding unit 25 into the graphic RAM 13. The image data on the graphic RAM 13 is displayed on the display 32 by an instruction from the CPU 10 in a manner similar to the case of recording of the image.

The compressed image data on the magnetooptic disc is displayed as mentioned above.

When the image print is obtained, in a state in which the foregoing image is displayed on the display 32, the CPU 10 instructs the output data flow controller 30 to send the image data on the graphic RAM 13 to the LBP 31.

As a display, a well-known liquid crystal display, a CRT (cathode ray tube), or the like may be used. The LBP denotes a well-known laser beam printer in which by irradiating a photosensitive drum with a laser beam, the toner is deposited onto the photosensitive drum and by transferring the toner onto a paper, thereby obtaining a print.

The second embodiment of the invention will now be described.

In a manner similar to the first embodiment, the image index is first recorded on the magnetooptic disc 35 prior to the actual recording of the original image.

Subsequently, in a manner similar to the first embodiment, the document name registration sheet is formed, the operator writes the document name to be conveniently used when retrieving the original later onto the document name registration sheet. On the other hand, an "x" mark or the like is written into the mark frame 209 associated with the image index regarding the original.

Even when recording the document onto the magnetooptic disc, in a manner similar to the first embodiment, the original bundle 1 is put on the original supporting plate 2 as shown in FIG. 6 and when the operator instructs the performing of the recording operation by the function key 34, the conveyance of the original is started.

The document name registration sheet 200 is stacked at the head of the original bundle 1.

The operations for detecting and analyzing the document name registration sheet are also executed in a manner similar to the first embodiment. The image index pattern in which "1" has been set at the bit position corresponding to the index image marked on the document name registration sheet is formed on the document management file.

In the embodiment, the extracting operation of the graphic document name is not executed but the whole surface of the image is set to the first page of the document and the document name registration sheet is compressed and recorded onto the magnetooptic disc 35 in a manner similar to the ordinary original. FIG. 18 shows a state of the document management file at the time when the reading operation is finished as mentioned above.

When retrieving, after the operator selects the image index pattern in a manner similar to the first embodiment, the CPU 10 searches the record having the coincident image index pattern on the document management file, so that the document is retrieved.

Subsequently, by the control of the CPU 10, along the path mentioned in the first embodiment, the image information of the first page of a certain document among the retrieved documents is first read out from the magnetooptic disc 35 and is expanded and, after that, the image information is transferred to the graphic RAM 13.

The CPU 10 reads the graphic RAM 13, thereby again executing the operations for detecting and analyzing the document name registration sheet in a manner similar to the first embodiment. Since the detecting and analyzing operations at this time are executed to decide the extracting area of the graphic document name, namely, to obtain the coordinates and rotational angle θ on the graphic RAM at the point IP in FIG. 1, the bar codes 202, 206, and 207 and the image index mark column are not analyzed.

In a manner similar to the first embodiment, the correction of the oblique movement of the sheet is executed for the document name column on the basis of IP and θ. Namely, as shown in FIG. 3, an image process is executed in a manner such that by copying the pixels in the vertical direction each time the image moves by a distance corresponding to certain pixels in the horizontal direction, all of the written document names lie within the document name area 205. The image data in the document name area 205 is subsequently transferred to the display 32 through the output data flow controller 30.

By executing the above operations for all of the documents retrieved, the batch display of the graphic document names shown in FIG. 4 is obtained in a manner similar to the first embodiment.

Therefore, the operator operates the function key 34 and selects one document, so that the image of a desired original is displayed in a manner similar to the first embodiment.

The embodiment has an advantage such that the reading operation is finished in a short time because the extracting operation of the graphic document name is not performed when the original is read as compared with the first embodiment.

The third embodiment will now be described.

In a manner similar to the first embodiment, the user first previously records the image index onto the magnetooptic disc 35 prior to recording the actual original image.

In a manner similar to the first embodiment, the document name registration sheet is subsequently formed and the document name to be conveniently used to retrieve the original later is written onto the document name registration sheet. An "x" mark or the like is written into the mark frame 209 associated with the image index regarding the original.

Even when the document is recorded, in a manner similar to the first embodiment, the original bundle 1 is put on the original supporting plate 2 as shown in FIG. 6 and when the operator instructs the recording operation by the function key 34, the conveyance of the original is started.

The document name registration sheet 200 as index means shown in FIG. 1 has been put at the head of the original bundle 1.

The operations for detecting and analyzing the document name registration sheet are also executed in a manner similar to the first embodiment. The image index pattern in which "1" has been set at the bit position corresponding to the index image marked on the document name registration sheet is written onto the document management file.

In this embodiment, in a manner similar to the second embodiment, the extracting operation of the graphic document name is not executed but the whole surface of the image is set to the first page of the document and the document name registration sheet is compressed in a manner similar to the ordinary original and is recorded onto the magnetooptic disc 35. FIG. 19 shows a state of the document management file at the time when the reading operation is finished as mentioned above. Since the graphic document name is not extracted, nothing is written in the column of the graphic document name node at this time point.

After such a document reading operation is executed a plurality of number of times, by operating the function key 34, a batch extracting operation, which will be explained hereinlater, is performed.

The batch extracting operation is generally executed in a time zone such as a time zone at night or the like during which the reading or retrieving operation of the document according to the apparatus is not executed for a relatively long time.

The CPU 10 first searches one record in which nothing is written in the column of the graphic document name node in the document management file.

Along the path mentioned in the first embodiment, the image information of the first page of the document in which nothing is written in the graphic document name node is read out from the magnetooptic disc 35 and is expanded. After that, the image information is transferred to the graphic RAM 13.

By subsequently reading the graphic RAM 13, the CPU 10 again executes the detecting and analyzing operations of the document name registration sheet in a manner similar to the first embodiment. However, the detecting and analyzing operations at this time are performed to decide the extracting area of the graphic document name, namely, to obtain the coordinates and rotational angle θ on the graphic RAM of the IP point in FIG. 1. Therefore, the bar codes 202, 206, and 207 and the image index mark column are not analyzed.

In a manner similar to the first embodiment, on the basis of IP and θ, the correction of the oblique movement of the sheet is executed for the document name column. That is, as shown in FIG. 3, an image process is performed in a manner such that by copying the pixels in the vertical direction each time the image is moved by a distance corresponding to certain pixels in the horizontal direction, all of the document names written lie within the document name area 205.

Subsequently, the image of the document name area 205 on the graphic RAM 13 is sent to the magnetooptic disc drive 115 through the disc interface 27 and is written as a graphic document name onto the magnetooptic disc. The FAT entry corresponding to the written cluster and the record based on the written data size are added into the node table of FIG. 14. In this instance, a node number newly generated is written into the column of the graphic document name node of the document management file.

The executing the above operations with respect to all of the records in which nothing is written in the column of the graphic document name node in the document management file, the batch extracting operation is completed.

After that, the retrieval, display, and output of the document are executed in substantially the same manner as the first embodiment.

According to the embodiment, as compared with the first embodiment, since the extracting operation of the graphic document name is not executed when the original is read, there is an advantage such that the reading operation is finished in a short time. Further, since there is also no need to execute the extracting operation even at the time of retrieval, there is an advantage such that the display of the retrieval result shown in FIG. 4 is also finished in a short time.

The fourth embodiment will now be described. The fourth embodiment relates to a retrieval in the case where a document added with the graphic document name and a document added with the document name by a character code inputted from the keyboard exist together.

A method of recording a document by using a document name registration sheet is similar to that of the first embodiment. In case character codes are needing for the document name without using the graphic document name, the document name of the character code is inputted from a keyboard 37. As a document management file, a file as shown in FIG. 20 is formed.

Therefore, either one of the node of the image data of the graphic document name and the document name of the character code is included in the document file for each document.

In the document management file in FIG. 20, the document in which the item of the node of the graphic document name is equal to θ denotes a document in which the graphic document name is not added.

The display of the retrieval result list will now be described.

The display operation is performed by the graphic RAM 13, output data flow controller 30, display 32, and CPU 10 for controlling them.

The CPU discriminates whether the document name denoted by the character code as a first index exists or the graphic document name as a second index exists with respect to the record of the document management file in FIG. 20 selected as mentioned above. The document name or graphic document name which exists is displayed by a retrieval result.

As such a display method of the retrieval result, a method shown in FIGS. 26 and 27 can be used.

That is, according to such a method, the display area of the document name denoted by the character code and the display area of the graphic document name are arranged in parallel and the document name denoted by the character code and the graphic document name can be individually displayed in each display area in the state corresponding to the file number. Therefore, the document added with the document name denoted by the character code and the retrieval result of the document added with the graphic document name can be displayed so as to exist together, so that a desired document can be easily specified.

It is generally sufficient, however, to use either one of the graphic document name and the character code document name for one document and only one of them is often set. Therefore, according to the display method of FIG. 26, areas shown by (a, b, c) in the diagram are always space columns and the display area is used unnecessarily.

In the case, on the other hand, where the character code document name is given by the keyboard or the like after completion of the storing the document to which the graphic document name has been added, as shown in FIG. 27, the index having the same meaning is overlappingly displayed. Even in this case, the display area is unnecessarily used as well.

To solve such a problem, a display method which can eliminate the unnecessary display area in case of displaying the retrieval result list including the document name denoted by the character code and the graphic document name will now be described.

FIG. 21 shows a display example of a retrieval result list in the embodiment. As shown in the diagram, in a state in which the document names denoted by the character codes and the graphic document names exist together, the maximum number of document names are displayed without unnecessarily using the display area. The display operation will be described later.

Further, in the case where the graphic document name exists, namely, with respect to the document in which the item of the node in FIG. 20 is not equal to 0, the CPU 10 obtains the FAT entry from the graphic document name node of the record of the document management file selected as mentioned above to the image data of the graphic document name through the node table. The CPU 10 reads out the image data of each graphic document name from the magnetooptic disc 35 and writes in the graphic RAM 13 and displays on the display 32 through the output data flow controller 30. The total number of pages is also displayed.

The operations after the operator selects one of the documents by operating the function key 34 are similar to those in the first embodiment.

Figure 25:
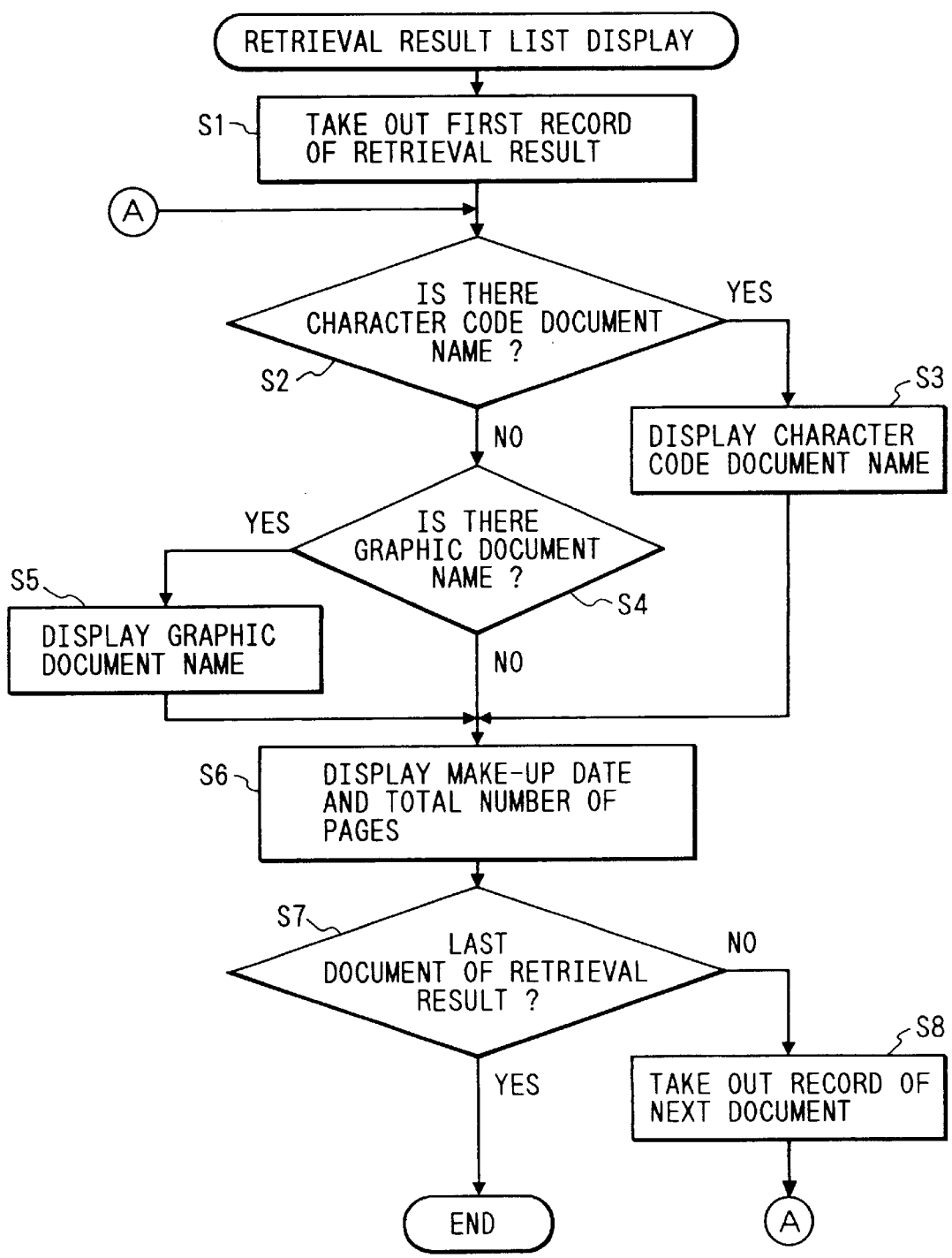
FIG. 25 is a flowchart showing the display operation of the retrieval result in the embodiment.

FIG. 25 is a flowchart showing the display operation of the retrieval result list shown in FIG. 21.

First in step S1, the document record of the first document of the retrieval result shown in FIG. 20 is extracted. In step S2, a check is made to see if the character code document name exists in such a document or not. When the character code document name exists, the character code document name is displayed in step S3 and the processing routine advances to step S6. When the character code document name doesn't exist, in step S4, a check is made to see if the graphic document name exists or not. When the graphic document name exists, namely, when the item of the node is not equal to 0, the graphic document name is drawn in step S5 and the processing routine advances to step S6.

In step S6, the make-up date of the document and the total number of pages included in the document are drawn. In step S7, a check is subsequently made to see if the document record relates to the last document of the retrieval result or not. If NO, the next document record is extracted in step S8. The processing routine is returned to step S2. If YES, the display process of the retrieval result list is finished.

The retrieval result list shown in FIG. 21 is displayed by such a control.

A trailer index will now be described.

First, FIG. 22 is a diagram showing a sate in which the image added with the graphic document name by the foregoing storing operation is retrieved and displayed by the retrieving operation mentioned above.

In case of again retrieving the image later, if there is a possibility of execution of the retrieval by the character code document name, for example, the retrieval by the coincidence of the character train portion such as "experiment report *" or the like, a character code index is inputted from the keyboard 37 by the operator. Such a process is called a trailer index.

Namely, the operator observes the graphic document name shown in FIG. 22 and inputs the character code document name while simultaneously confirming the image displayed.

FIG. 23 is a diagram showing a state of the document management file after the character code document name was inputted as mentioned above.

After that, the result retrieved by the image index as mentioned above is such that the character code document name is displayed as shown in FIG. 24. That is, in the case where both of the character code document name and the graphic document name exist, the character code document name is preferentially displayed.

In the above embodiment, although the method as shown in FIG. 21 has been used as an optimum display method of the retrieval result list, the display methods shown in FIGS. 26 and 27 are also included in the invention. As display methods according to other embodiments of the invention, those methods have a sufficiently satisfactory effect from the viewpoint that the character code document name and the graphic document name are displayed so as to exist together.

The fifth embodiment will now be described. The fifth embodiment relates to a process for recognizing the characters of the graphic document name written in the document name column of the document registration sheet and for converting into the code information.

Figure 28:
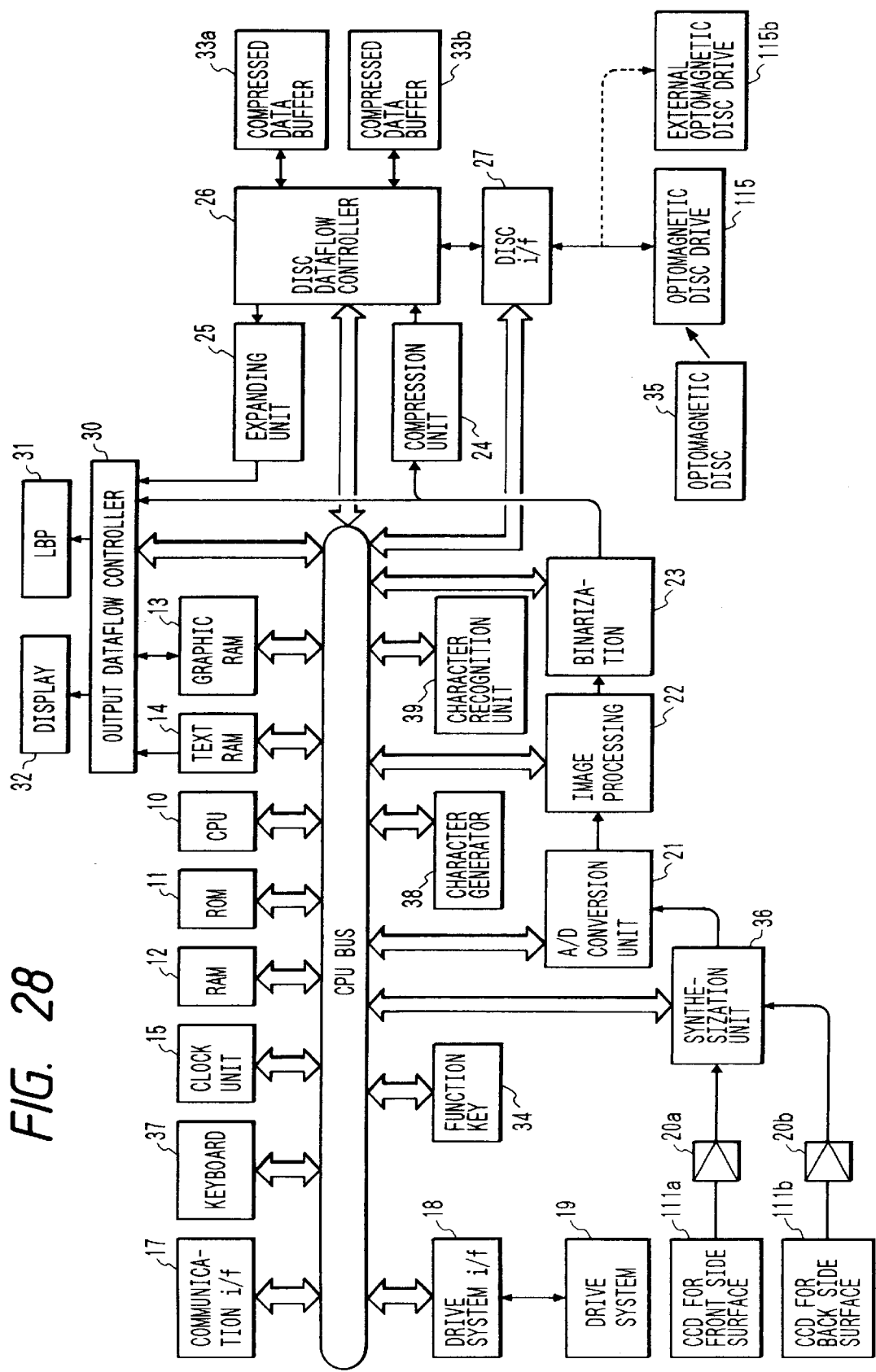
FIG. 28 is a block diagram showing the construction of an image filing apparatus according to the fifth embodiment.

FIG. 28 is a block diagram showing a construction of an image filing apparatus in the fifth embodiment. A character recognition unit 39 is added to the construction of FIG. 8.

In a manner similar to the first embodiment, the document registration sheet is read and the characters of the document name column are extracted and stored in the RAM 12. After that, the image data is sent to the character recognition unit 39. The character recognition unit 39 executes a well-known character recognizing process and converts the image data to the character code data. The converted character code data is stored as character code document name in the character code document name column of the document management file in FIG. 20.

When the characters cannot be recognized, the conversion to the character code data is stopped and a recording process of the graphic document is executed in a manner similar to the fourth embodiment.

Therefore, when the characters can be recognized, the printing types generated from a character generator 38 are displayed on the retrieval result screen. When the characters cannot be recognized, the document name described in the document name column of the document registration sheet is displayed as a graphic document name.

The character recognizing process can be also executed in a time zone similar to that of the recording process of the graphic document name in the second and third embodiments.

The present invention is not limited to the foregoing embodiments but many modifications and variations are possible within the spirit and scope of the appended claims of the invention.

What is claimed is:

1. An image filing apparatus comprising:

input means for inputting an image of a document and an image of an index sheet to set an index for the document, the index sheet having an index area into which an operator writes a name of the document;

storing means for storing the image of the document input by said inputting means in a storage medium; and processing means for (i) extracting an image of the index area of the index sheet input by said inputting means, (ii) handling the extracted image as an image representing a name of the document image to be stored in said storage medium, (iii) retrieving the document image stored in said storage medium based on retrieval information selected by an operator, and (iv) controlling a display device to display the extracted images corresponding to the document images retrieved by said processing means as a name list of the retrieved document images.

2. An image filing apparatus for storing a document image which is read by an image reading means to a storage medium, for retrieving desired document images from said storage medium, and for displaying a list of a plurality of retrieved images on display means, comprising:

memory means for storing a first index based on code information to identify the document image and a second index based on image information to identify the document image based on the image read by the image reading means; and processing means for (i) setting the first index and storing the first index in said memory means, (ii) setting the second index and storing the second index in said memory means, (iii) retrieving the document image stored in said storage medium in accordance with retrieval information selected by an operator; and (iv) controlling the display means to display a retrieval result list of the retrieved documents, wherein said processing means controls the display means to display one of the first index and the second index in the retrieval result list when only one of the first index and the second index for the same document image is stored in said memory means and controls the display means to display the first index in the retrieval result list when both the first index and the second index are stored in said memory means.

3. An apparatus according to claim 2, wherein said processing means extracts an image of a predetermined area of a specific sheet read by the image reading means and controls the display means to display the extracted image as a second index.

4. An apparatus according to claim 3, wherein the predetermined area of the specific sheet is an area into which an operator writes a document name.

5. An apparatus according to claim 2, wherein a display area of the first index in said display means is also used as a display area of the second index.

6. An image filing apparatus for storing document images which are read by an image reading means in a storage medium, for retrieving a desired document image from the storage medium, and for displaying a list of a plurality of retrieved images on display means, comprising:

input means for inputting code information representing document names of the document images which are stored in said storage medium; and processing means for (i) extracting the image written by an operator in a specific area of a specific sheet which is read by said image reading means together with the document image;

(ii) handling the extracted image as an index of the document image;

(iii) retrieving the document image in accordance with retrieval information selected by an operator; and (iv) controlling the display means to display a retrieval result list of the retrieved document images, wherein said processing means causes a character represented by the input code information to be listed in the retrieval result list when code information representing the document name is input on the document image by said input means, and causes the extracted image handled as an image representing the document name to be listed in the retrieval result list when the code information representing the document name is not input on the document image by said input means.

7. An apparatus according to claim 6, wherein the specific area of the specific sheet is an area into which an operator writes a document name.

8. An apparatus according to claim 6, wherein a display area of the first index in said display means is also used as a display area for the second index.

9. An image filing apparatus comprising:

inputting means for inputting an image of a document and an image of an index sheet to set an index of the original;

storing means for storing the image of the document input by said inputting means in a storage medium;

processing means for extracting an image of a predetermined area of the index sheet input by said inputting means; and converting means for converting the extracted image to a character code;

wherein said processing means further performs the functions of setting the converted character code as an index of the document image which is stored in the storage medium, retrieving the document image stored in said storage medium, and causing a display device to display the index of the retrieved document image, and wherein when said converting means converts the extracted image to the character code, said processing means causes the display device to display the character represented by said character code, and when said converting means cannot convert the extracted image to the character code, said processing means causes the display device to display the extracted image.

10. An apparatus according to claim 9, wherein the predetermined area of the index sheet is an area into which an operator writes a document name.

11. An image filing method comprising the steps of:

a) inputting an image of a document and an image of an index sheet to set an index for the document, the index sheet having an index area into which an operator writes the name of the document;

b) extracting an image of the index area of the index sheet input in said inputting step;

c) storing the image of the document input in said inputting step in a storage medium;

d) handling the image extracted in said extracting step as an image representing the name of the document image to be stored in the storage medium;

e) retrieving the document image stored in the storage medium based on retrieval information selected by an operator; and f) causing a display device to display the extracted images corresponding to the document images retrieved in said retrieving step as a name list of the retrieved document images.

12. A control method in an image filing apparatus for storing a document image, which is read by image reading means, in a storage medium, for retrieving desired document images from the storage medium, and for displaying a list of a plurality of retrieved images on display means, comprising the steps of:

a) setting a first index based on code information to identify the document image;

b) setting a second index based on image information to identify the document image based on the image read by the image reading means;

c) storing the first index set in said step a) and said second index set in said step b) in a memory;

d) retrieving the document image stored in the storage medium in accordance with retrieval information selected by an operator; and e) causing the display means to display a retrieval result list of the document images retrieved in said step d), wherein said causing step causes one of the first index and the second index to be displayed in the retrieval result list when only one of the first index and the second index for the same document image is stored in the memory and causes the first index to be displayed when both the first index and the second index are stored in the memory.

13. A method according to claim 12, wherein said step b) extracts an image of a predetermined area of a specific sheet read by the image reading means and displays the extracted image as the second index.

14. A method according to claim 13, wherein the predetermined area of the specific sheet is an area into which an operator writes a document name.

15. A method according to claim 12, wherein the display area of the first index in said display means is also used as the display area of the second index.

16. A control method in an image filing apparatus for storing document images, which are read by image reading means, in a storage medium, for retrieving a desired document image from the storage medium, and for displaying a list of a plurality of retrieved images on display means, comprising the steps of:

a) inputting code information representing document names of the document images which are stored in the storage medium as code information;

b) extracting the image written in a specific area of a specific sheet which is read by the image reading means together with the document image;

c) handling the image extracted in said step b) as an image representing a name of the document image;

d) retrieving the document image in accordance with retrieval information selected by an operator; and e) causing the display means to display a retrieval result list of the document images retrieved in said step d), wherein said causing step causes a character represented by the input code information to be listed in the retrieval result list when code information representing the document name is input on the document image in said step a) and causes the extracted image handled in said step c) to be listed in the retrieval result list when the code information representing the document name is not input on the document image in said step a).

17. A method according to claim 16, wherein specific area of the specific sheet is an area into which an operator writes a document name.

18. A method according to claim 16, wherein a display area of the document name in said display means is also used as a display area for the index.

19. An image filing method comprising the steps of:

a) inputting an image of an original document and an image of an index sheet to set an index of the original;

b) storing the image of the document input in said step a) in a storage medium;

c) extracting an image of a predetermined area of the index sheet input in said step a);

d) converting the image extracted in said step c) to a character code;

e) setting the character code converted in said step d) as an index of the document image which is stored in the storage medium;

f) retrieving the document image stored in the storage medium; and g) causing a display device to display the index of the document image retrieved in step f), wherein when said step d) converts the extracted image to the character code, said causing step causes the display device to display the character which is represented by said character code, and when said step d) cannot convert the extracted image to the character code, said causing step causes the display device to display the extracted image.

20. A method according to claim 19, wherein the predetermined are of the index is an area into which an operator writes a document name.

* * * * *

UNITED STATES PATENT AND TRADEMARK OFFICE
CERTIFICATE OF CORRECTION

PATENT NO. : 6,052,494　　　　　　　　　　　　　　Page 1 of 2
DATED     : April 18, 2000
INVENTOR(S) : Kazuo Ohtani It is certified that error appears in the above-indentified patent and that said Letters Patent is hereby corrected as shown below:

Title Page, item [54] and Col.1, title should read --
Image Filing Apparatus that uses an Extracted image as an Image Representing A Name of a document image --.

COLUMN 6
Line 21, "is" should read --it--.
Line 34, "processes" should read --processed--.

COLUMN 10
Line 27, "one" (second occurrence) should read --on--.
Line 41, "form" should read --from--.

COLUMN 13
Line 14, "The" should read --By--.
Line 38, "needing" should read --needed--.
Line 49, "θ" should read --0--.

COLUMN 15
Line 7, "sate" should read --state--.

UNITED STATES PATENT AND TRADEMARK OFFICE
CERTIFICATE OF CORRECTION

PATENT NO. : 6,052,494
DATED : April 18, 2000
INVENTOR(S) : Kazuo Ohtani

It is certified that error appears in the above-indentified patent and that said Letters Patent is hereby corrected as shown below:

<u>COLUMN 20</u>

Line 21, "are" should read --area--, and "index" should read --index sheet--.

Signed and Sealed this

Twentieth Day of March, 2001

Attest:

NICHOLAS P. GODICI

*Attesting Officer*    *Acting Director of the United States Patent and Trademark Office*